United States Patent
Benhanokh et al.

(10) Patent No.: US 11,409,666 B2
(45) Date of Patent: Aug. 9, 2022

(54) TECHNIQUES FOR PROVIDING I/O HINTS USING I/O FLAGS

(71) Applicant: EMC IP Holding Company LLC, Hopkinton, MA (US)

(72) Inventors: Gabriel Benhanokh, Tel-Aviv (IL); Sanjib Mallick, Bangalore (IN); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 7 days.

(21) Appl. No.: 16/692,145

(22) Filed: Nov. 22, 2019

(65) Prior Publication Data

US 2021/0157744 A1   May 27, 2021

(51) Int. Cl.
*G06F 12/122* (2016.01)
*G06F 3/06* (2006.01)
*G06F 12/0868* (2016.01)
*G06F 12/126* (2016.01)

(52) U.S. Cl.
CPC .......... *G06F 12/122* (2013.01); *G06F 3/0656* (2013.01); *G06F 12/0868* (2013.01); *G06F 3/061* (2013.01); *G06F 12/126* (2013.01)

(58) Field of Classification Search
CPC ...... G06F 12/122; G06F 3/061; G06F 3/0656; G06F 3/0671; G06F 12/0868; G06F 12/126; G06F 16/24552; G06F 2212/1016; G06F 2212/1032; G06F 2212/163; G06F 2212/262; G06F 2212/465
See application file for complete search history.

(56) References Cited

U.S. PATENT DOCUMENTS

| 5,727,232 | A  | * | 3/1998  | Iida       | G06F 3/061    |
|           |    |   |         |            | 711/E12.019   |
| 6,148,368 | A  | * | 11/2000 | DeKoning   | G06F 12/0866  |
|           |    |   |         |            | 710/53        |
| 6,732,124 | B1 | * | 5/2004  | Koseki     | G06F 11/1435  |
| 9,547,459 | B1 | * | 1/2017  | BenHanokh  | G06F 3/0614   |
| 9,626,116 | B1 | * | 4/2017  | Martin     | G06F 11/3034  |
| 9,678,869 | B1 | * | 6/2017  | Chanler    | G06F 12/0802  |

(Continued)

OTHER PUBLICATIONS

Nvm Express, "Base Specification," NVM Express Revision 1.4, Jun. 10, 2019.

*Primary Examiner* — Reginald G Bragdon
*Assistant Examiner* — Sakhr A Aldaylam
(74) *Attorney, Agent, or Firm* — Muirhead and Saturnelli, LLC

(57) ABSTRACT

Techniques for processing I/O operations may include: issuing, by a process of an application on a host, an I/O operation; determining, by a driver on the host, that the I/O operation is a read operation directed to a logical device used as a log to log writes performed by the application, wherein the read operation reads first data stored at one or more logical addresses of the logical device; storing, by the driver, an I/O flag in the I/O operation, wherein the I/O flag has a first flag value denoting an expected read frequency associated with the read operation; sending the I/O operation from the host to the data storage system; and performing first processing of the I/O operation on the data storage system, wherein said first processing includes using the first flag value in connection with caching the first data in a cache of the data storage system.

18 Claims, 12 Drawing Sheets

(56) References Cited

U.S. PATENT DOCUMENTS

| | | | |
|---|---|---|---|
| 9,684,593 B1* | 6/2017 | Chen | G06F 12/0811 |
| 9,864,688 B1* | 1/2018 | O'Brien | G06F 9/46 |
| 10,296,255 B1* | 5/2019 | Tummala | G06F 3/0689 |
| 2008/0162885 A1* | 7/2008 | Wang | G06F 9/3842 |
| | | | 712/214 |
| 2011/0320776 A1* | 12/2011 | Welc | G06F 9/526 |
| | | | 712/218 |
| 2014/0297950 A1* | 10/2014 | Kuwayama | G06F 3/0617 |
| | | | 711/114 |
| 2018/0173435 A1* | 6/2018 | Liu | G06F 3/0631 |

* cited by examiner

TECHNIQUES FOR PROVIDING I/O HINTS USING I/O FLAGS

BACKGROUND

Technical Field

This application generally relates to data storage and, in particular, providing hints for I/O (Input/Output) operations using I/O flags.

Description of Related Art

Data storage systems may include resources used by one or more host systems. Data storage systems and host systems may be interconnected by one or more communication connections such as in a network. These resources may include, for example, data storage devices such as those included in the data storage systems. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

In accordance with the techniques herein are a method, computer readable medium and system for processing I/O operations comprising: issuing, by a process of an application on a host, an I/O operation; determining, by a driver on the host, that the I/O operation is a first read operation directed to a logical device used as a log to log writes performed by the application, wherein the first read operation reads first data stored at one or more logical addresses of the logical device; storing, by the driver, an I/O flag in the I/O operation, wherein the I/O flag has a first flag value denoting an expected read frequency associated with the first read operation; sending the I/O operation from the host to the data storage system; and performing first processing of the I/O operation on the data storage system, wherein said first processing includes using the first flag value in connection with caching the first data in a cache of the data storage system. The driver may be a multi-path I/O driver of the host. The driver may perform processing that determines the first data read by the first read operation is larger than a specified threshold size. The driver may determine that the first read operation is directed to the logical device used as a log to log writes performed by the application based on a process name associated with the process that issued the I/O operation. The process name may include a first portion and a second portion, and wherein the first portion may denote a particular process of the application and the second portion may be a customized portion denoting a particular instance of the application. The first portion of the process name may include a predetermined string used to identify the process that reads records from the log for the application. The application may be a database application. The flag value may be one of a plurality of predefined flag values, and the flag value may indicate that the first data, stored at the one or more logical addresses of the logical device, is expected to be read once by the application. Processing may include: storing the first data at a first cache location in the cache of the data storage system; returning the first data to the host; and responsive to returning the first data to the host, evicting the first data from the first cache location. Evicting may include marking the first cache location as free and available for use.

In at least one embodiment, processing may include issuing one or more additional I/O operations by a client performing a data service on the data storage system. The client may be an internal client of the data storage system.

In at least one embodiment, the internal client may perform backend verification processing of data and associated metadata stored on non-volatile physical storage devices of the data storage system, and the one or more additional I/O operations may include a second read operation that reads second data from a target location. The second read operation may include an I/O flag having a flag value indicating that the second data, stored at the target location, is expected to be read once by the internal client.

In at least one embodiment, the internal client may perform compressibility check processing that determines whether data stored on non-volatile physical storage devices of the data storage system is compressible, and wherein the one or more additional I/O operations may include a second read operation that reads second data from a target location. The second read operation may include an I/O flag having a flag value indicating that the second data, stored at the target location, is expected to be read once by the internal client.

In at least one embodiment, the internal client may perform relocation of data portions among non-volatile physical storage devices of the data storage system, and wherein the one or more additional I/O operations may include a second read operation and a write operation. The second read operation may read second data from a source location of a source device and the write operation may write the second data to a target location of a target device. Each of the second read operation and the write operation may include an I/O flag having a flag value indicating that the second data is expected to be read and written infrequently by the internal client.

In at least one embodiment, the internal client may perform processing to rebuild a failed drive of a RAID group, and wherein the one or more additional I/O operations may include one or more read operations that read data from at one or more healthy drives of the RAID group, and may include one or more write operations that write data to a replacement drive that replaces the failed drive. Each of the one or more read operations and each of the one or more write operations may include an I/O flag having a flag value indicating that the data associated with said each operation is expected to be read and written infrequently by the internal client.

In at least one embodiment, the internal client may perform recovery processing in connection with recovering from a power failure experienced by the data storage system. The one or more additional I/O operations may include a second read operation that reads recovery information, and wherein the second read operation may include an I/O flag having a flag value indicating that the data associated with the second read operation is expected to be infrequently read.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
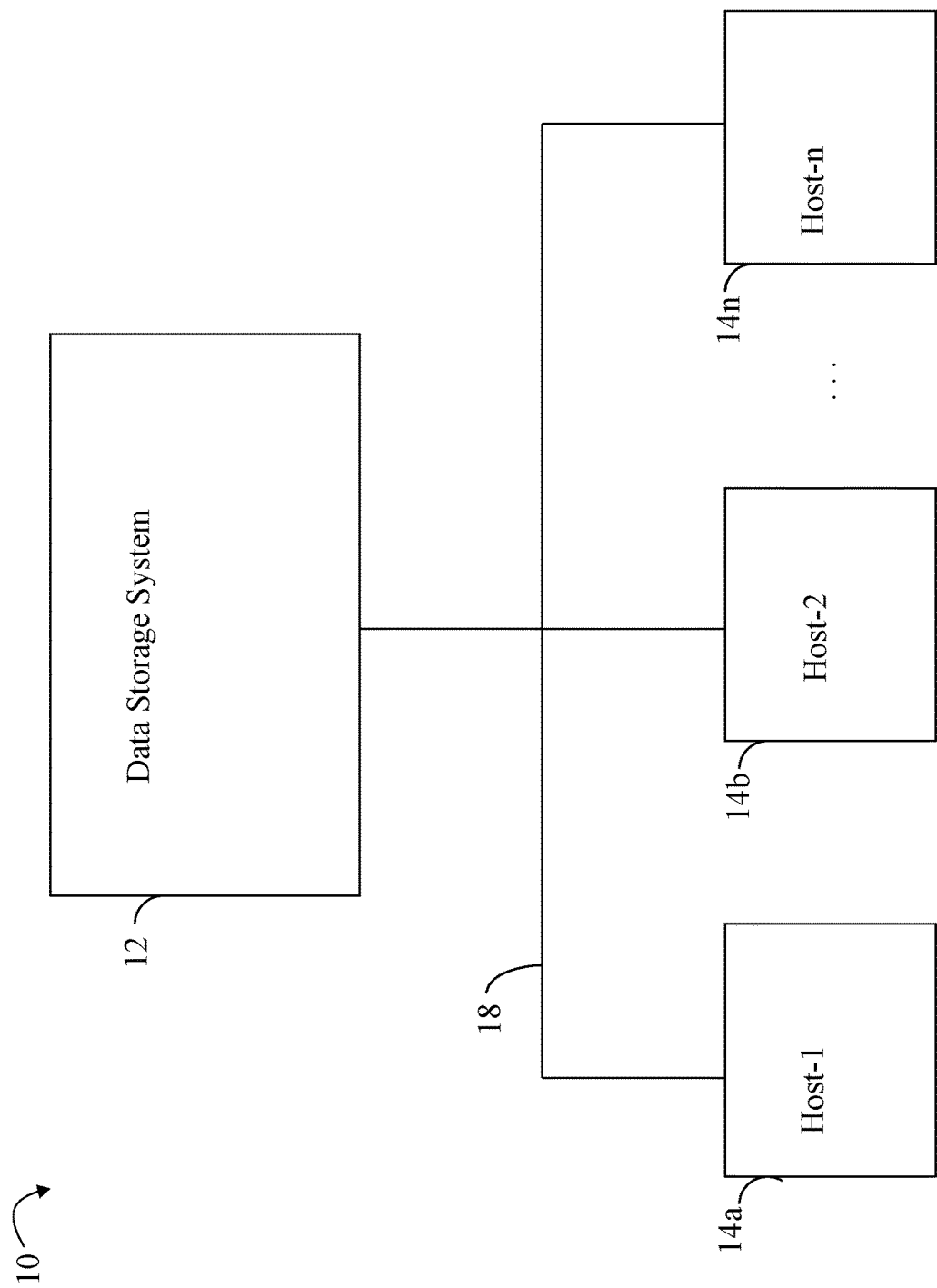
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, NVMe (Non-volatile Memory Express), and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix® VMAX® data storage system, as well one or more other data storage systems as may vary with the embodiment.

Figure 2A:
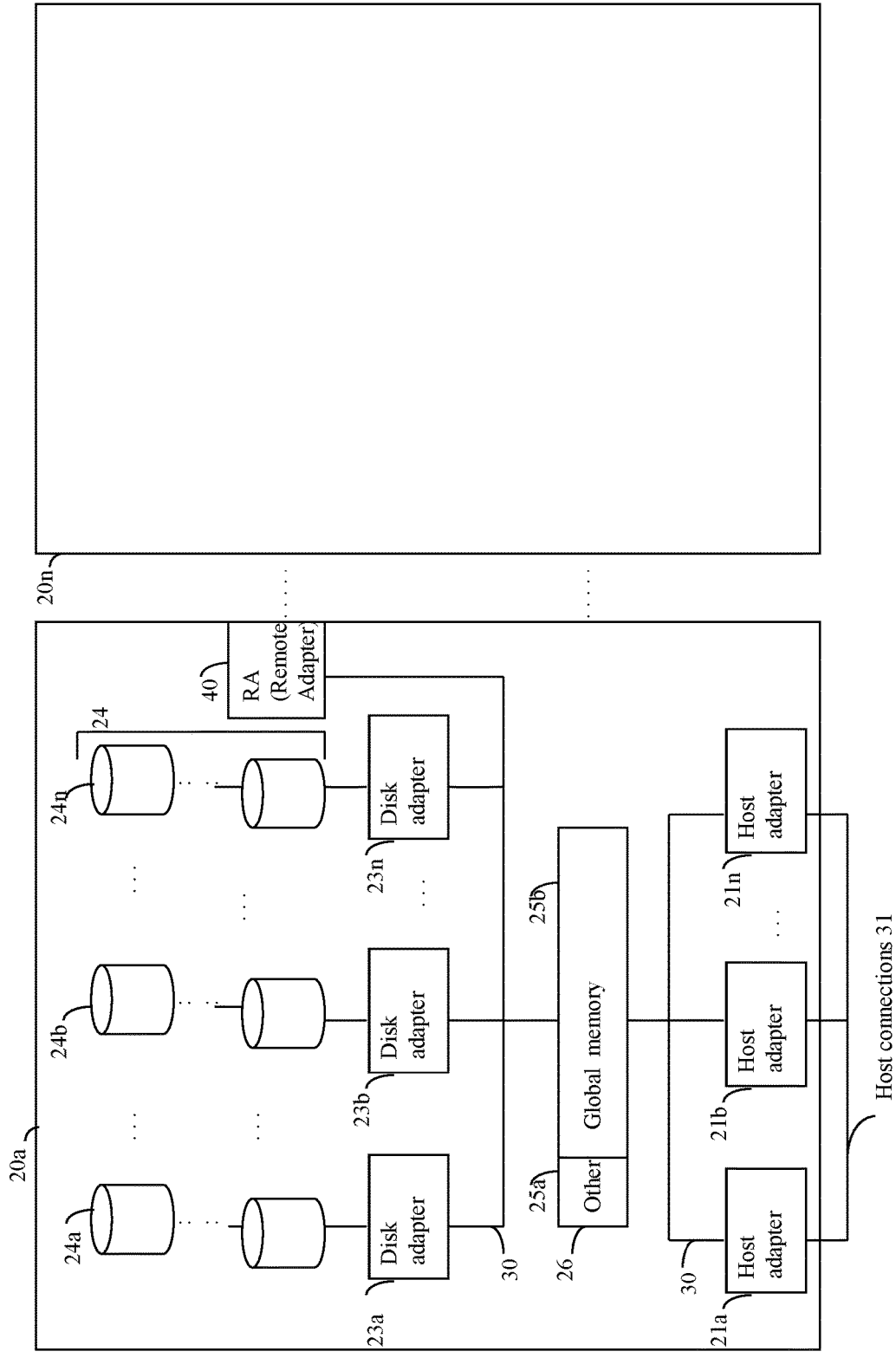
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n which are physical storage devices providing backend physical storage. In this arrangement, each of the n groupings of disks or physical storage devices may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system such as by EMC Corporation, a backend DA may also be referred to as a disk or physical device controller. The DA may perform operations such as reading data from, and writing data to, the non-volatile backend physical devices (e.g., physical storage devices also referred to as PDs) which are serviced by the DA. Consistent with description elsewhere herein, the physical storage devices providing the back-end physical storage may include any suitable non-volatile storage such as, for example, rotating disk drives, flash-based drives or more generally solid state drives, and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and more generally issue commands through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical storage devices or drives. For example, one or more LUNs may reside on a single physical storage device or drive. A LUN may also be referred to herein as a storage device or a logical storage device having is physical storage generally provisioned from one or more physical storage devices. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s), or more generally physical storage devices, and LUN(s) residing thereon.

A storage service may be used to service requests directed to storage devices, such as LUNs that are consumed by an application running on a host processor. Examples of storage services may include block-based data storage services (e.g., processes requests to read and write data to a LUN exposed by the data storage system as a block-based device), file-based data storage services (e.g., processes requests to read and write data to a file of a file systems having its storage provisioned from LUNs and thus physical storage of the data storage system) and object-based data storage services. It should be noted that an embodiment in accordance with techniques herein may provide such storage services using code that executes on the data storage system or another component other than the data storage system (e.g., components external to the data storage system). In at least one embodiment, at least some of the storage services may be reside in the data storage system. For example, a block-based storage service may include code that is executed by an HA or otherwise is provided in a service (e.g., code executed by another processor within the data storage system) that interfaces with the HA.

The DA performs I/O operations on a disk drive or other physical storage device. Data residing on a disk drive or other physical storage device may be accessed by the DA following a data request in connection with I/O operations that other directors originate. The DA may also be further characterized in at least one embodiment as a controller providing access to external physical drives or storage devices located on one or more external data storage systems rather than local physical drives located in the same physical storage system as the DA (such as illustrated in FIG. 2A).

Figure 2B:
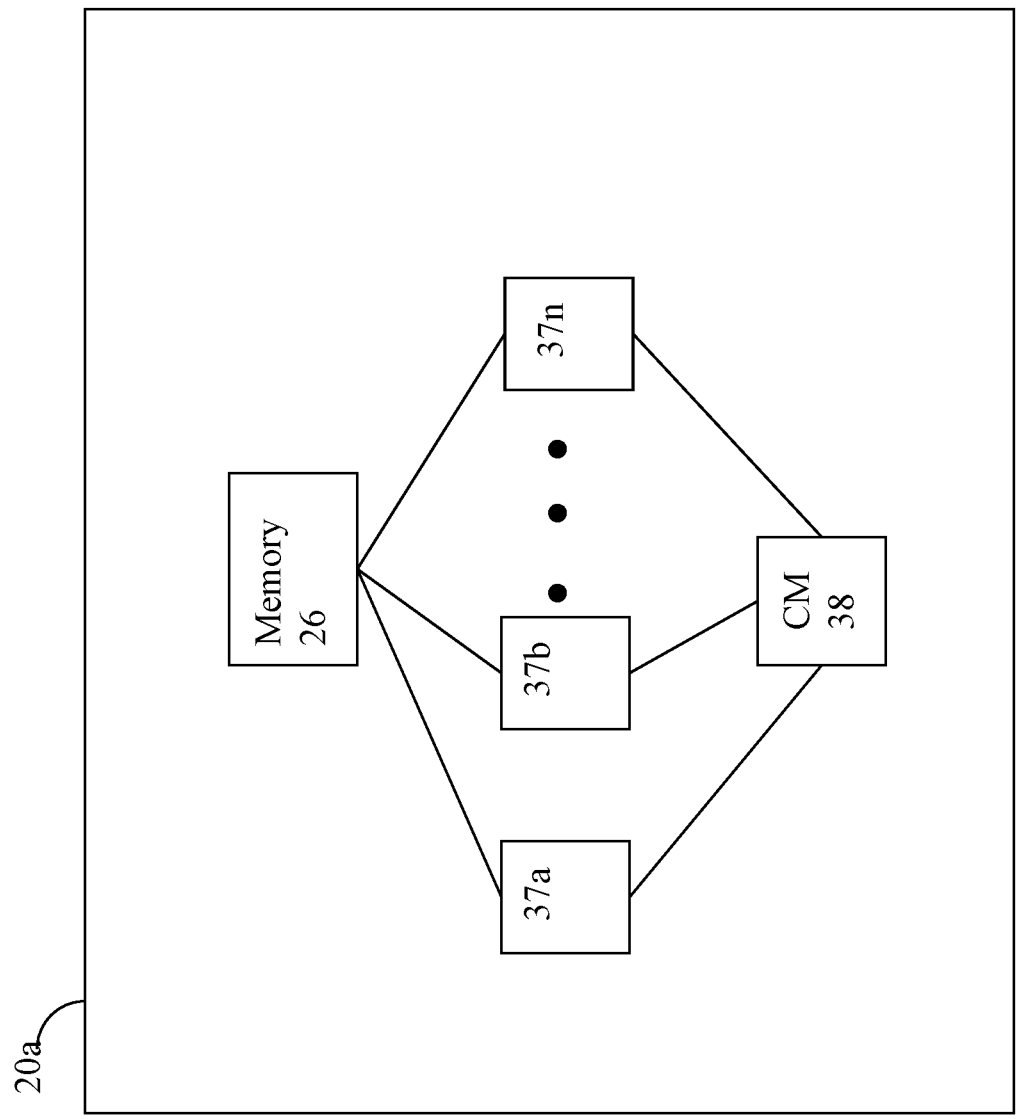
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Figure 2C:
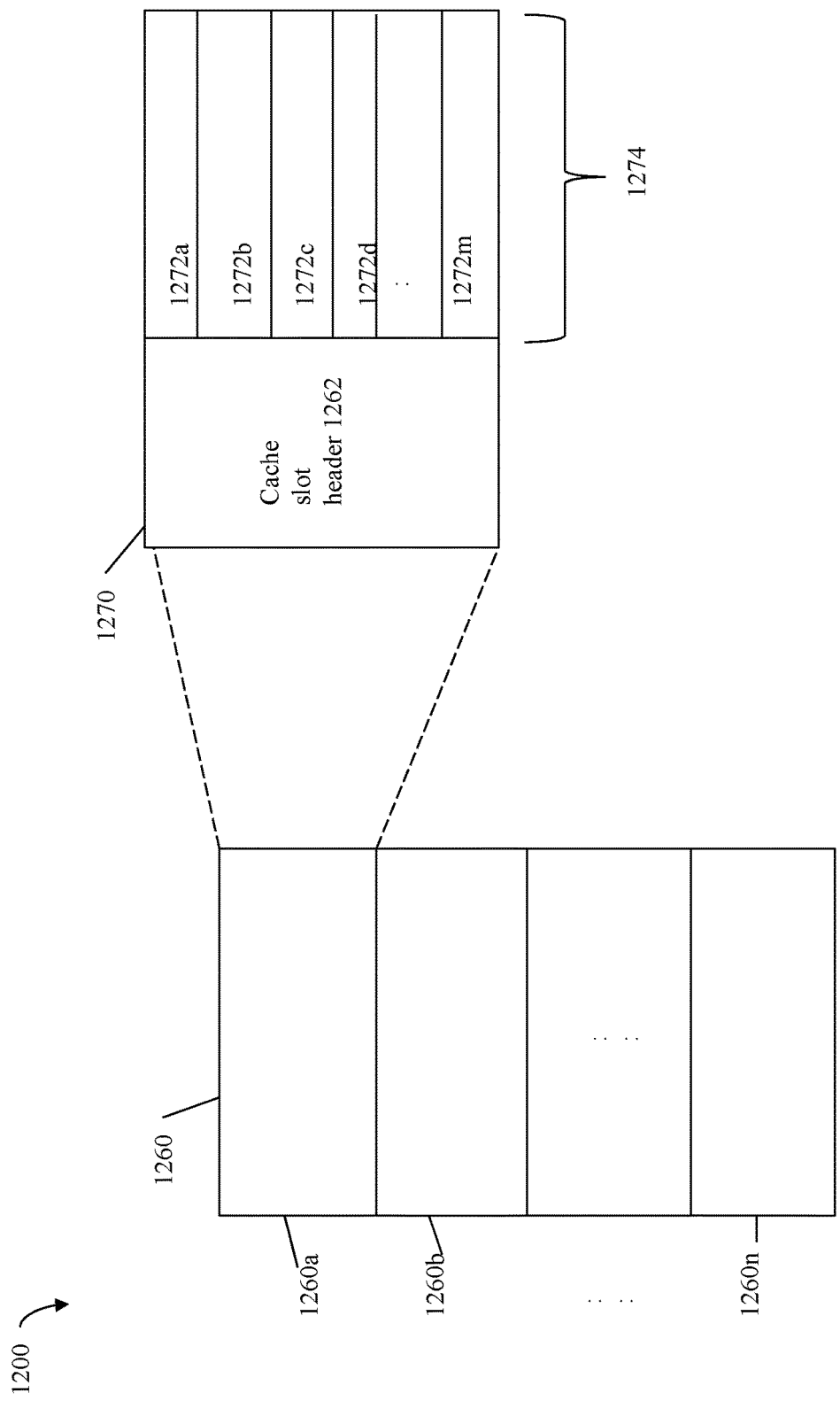
FIG. 2C is an example illustrating a logical representation of a cache in an embodiment in accordance with the techniques herein.

Referring to FIG. 2C, shown is an example illustrating a logical representation of a cache that may be used in an embodiment in accordance with the techniques herein. In the example 1200, element 1260 may represent the memory or storage used as the cache which is partitioned into cache slots or pages 1260a-1260n. It should be noted that the example 1200 is a logical representation of a cache that may be implemented using any suitable data structure(s) known in the art. The element 1270 provides additional detail of single cache slot or page 1260a. The cache slot or page 1260a may include a cache slot or page header 1262 and cache slot or page data 1274. The cache slot data 1274 illustrates that a single cache slot or page of data may further include multiple portions 1272a-m. The cache slot header 1262 may include additional information regarding the cached data stored in 1274. For example, the header 1272 may denote whether the data cached in each of the portions 1272a-m is write pending (WP) or dirty cached data.

It should be noted that the particular granularity or smallest unit of storage for storing cached data may vary with embodiment. For example, each of the portions 1272a-m may denote a smallest unit of storage for storing cached data. Additionally, the particular number of portions in a cache slot or page may also vary with embodiment.

When performing various data storage services or processing I/O operations that access data stored on a LUN, data read from and/or written to a LUN may be processed using the typical I/O or data path such as described herein. For example, consistent with other discussion herein, when reading data from a LUN of the data storage system where there is a cache miss and the read data is not current in the cache, the data may be read from the backend PD providing provisioned non-volatile storage for the LUN, stored in the cache of the data storage system, and then further read from the cache for use by one or more other components of the data storage system.

In at least one embodiment, the size of each cache page or cache slot may be a single track, such as 128K bytes. In at least one embodiment, backend I/Os performed when reading and/or writing data to a non-volatile physical storage device may be a single track. It should be noted that backend I/Os may be distinguished from front end I/Os. Front end I/Os may generally refer to I/Os received by an FA or HA of the data storage system from external clients, such as host. Backend I/Os may generally refer to I/Os in connection with reads and writes issued by a disk controller, such as a DA, when reading data from and writing data to the backend non-volatile storage devices providing provisioned storage for the LUNs. In at least one embodiment, the data storage system may destage or write out cached WP data from the cache to backend non-volatile physical storage devices on a per track basis (e.g., a track is the destaging size granularity).

Figure 2D:
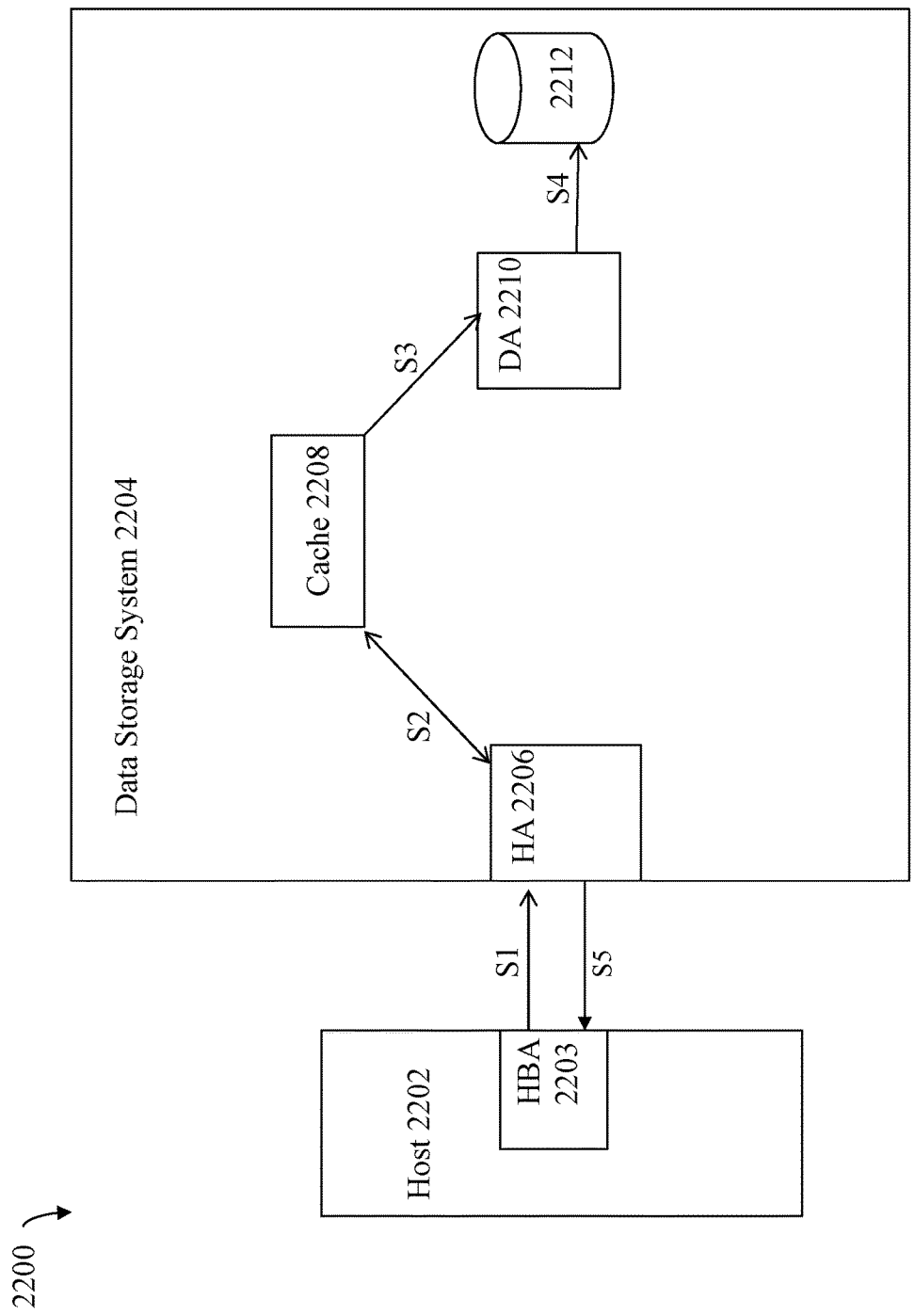
FIG. 2D illustrates processing that may be performed in connection with write I/O processing in an embodiment in accordance with the techniques herein.

Referring to FIG. 2D, shown is an example illustrating processing of a write I/O operation received at the data storage system in an embodiment in accordance with techniques herein, whereby a host, or other client, may issue the write operation. The example 2200 includes host 2202 and data storage system 2204. The host 2202 includes host bus adapter (HBA) 2203 having one or more ports used for communicating with the data storage system 2204. The data storage system 2204 includes a front end component, HA

2206, which receives I/Os from the host 2202. The data storage system 2204 also includes DA 2210, cache 2208 and a non-volatile physical storage device 2212, such as a disk drive. Generally, the host 2202 and data storage system 2204 may include components as described in more detail in connection with other figures herein. Details of other components of 2202, 2204, and connections therebetween, have been omitted for simplicity of illustration. The cache 2208 may be a global cache used by and between the different components of the system 2204, such as by the HAs, DAs, and other components of the system 2204 as described herein. Thus, data in the cache 2208 may be read from, and/or written to, by different components of the system 2204 such as for use with techniques herein as well as other purposes that may vary with embodiment. In one embodiment such as illustrated in the example 2200, the cache 2208 may be a portion of global memory of the data storage system 2204 whereby cache 2208 is used as a data cache for data that is read from and/or written to physical storage such as in connection with I/O operations received from the host 2202 at the data storage system 2204. In following paragraphs is processing performed for a write operation consistent with the illustration of FIG. 2D.

In step S1, the host 2202 may issue a write request over a port of its HBA 2203 where the write request is received by the HA 2206 of the data storage system 2204. In a step S2, the HA 2206 may store the write operation data in cache 208 and mark the cache slot or cache location as write pending (WP) thereby denoting the cache slot includes write data that needs to be written to physical storage. In some embodiments, the data storage system may return a response to the host indicating that the write operation has been completed successfully following S2 once the write data has been stored in the cache 2208. Once the write data has been stored in cache 2208 in step S2, processing may be performed at some time later to destage the write data from cache 2208 to the physical drive 2212. Thus, in a step S3, the DA 2210 may obtain the write data from cache 2208 and then store the write data in step S4 at the appropriate location on the physical device 2212. Although not described herein and as will be appreciated by those skilled in the art, other processing may be performed in connection with processing the write operation such as, for example, setting the cache slot location to no longer indicate WP once the write data is written to physical storage in step S4. In at least one embodiment in accordance with techniques herein, once the write data has been stored in the cache by step S2, an acknowledgement may be sent S5 from the data storage system to the host indicating completion of the write operation. Thus, in at least one embodiment, the acknowledgement in S5 may be sent independent of whether the write data has actually been written out to the physical drive 2212.

Figure 2E:
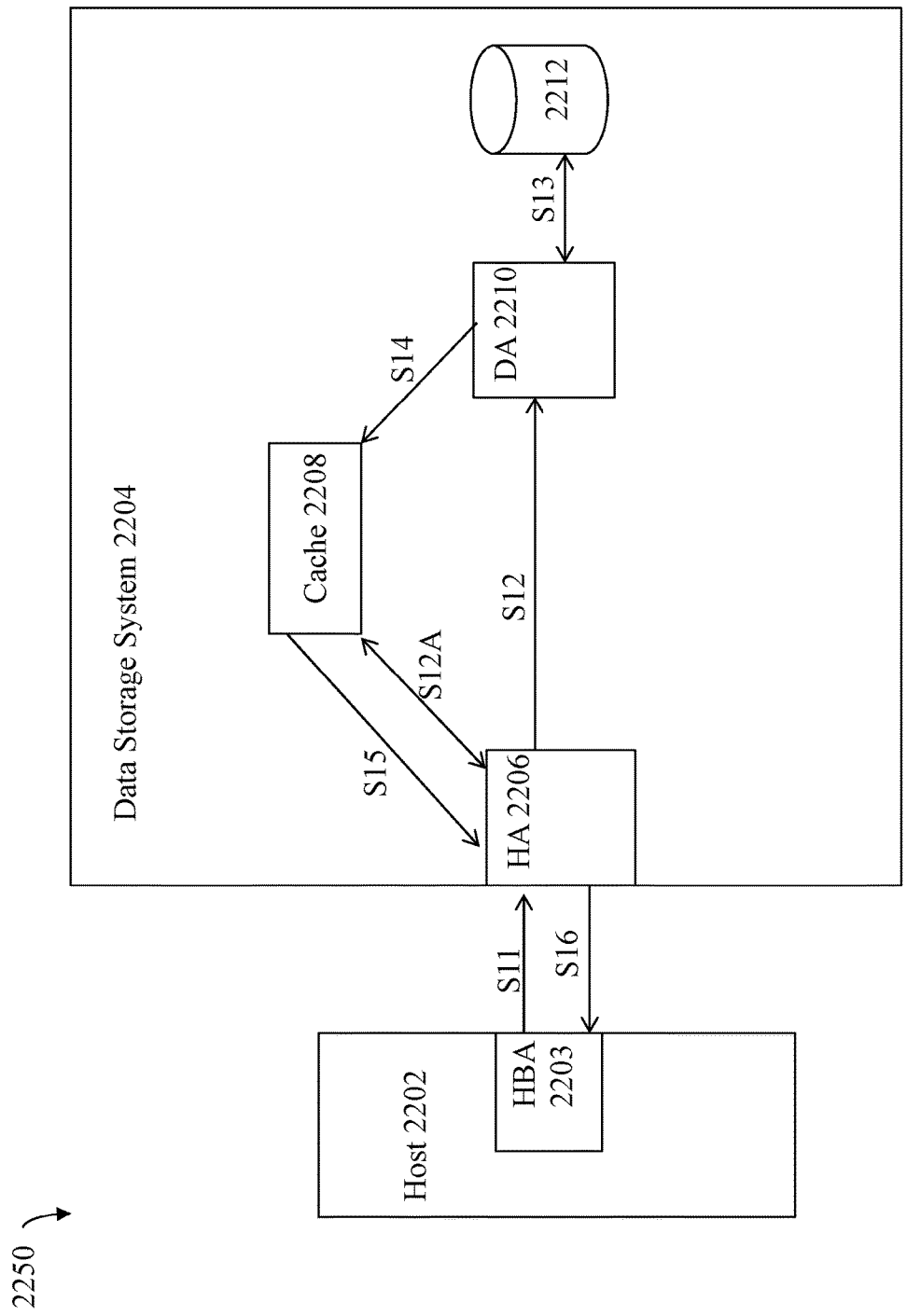
FIG. 2E illustrates processing that may be performed in connection with read I/O processing in an embodiment in accordance with the techniques herein.

Referring to FIG. 2E shown is an example illustrating processing of a read I/O operation received at the data storage system, in an embodiment in accordance with techniques herein, whereby a host may issue the read operation. The example 2250 includes host 2202, data storage system 2204, and components similarly numbered and as described elsewhere herein.

As a first step S11, the host 2202 sends the read request to the data storage system 2204. The read request may be received by HA 2206. The HA 2206 determines whether all the requested read data is in cache 2208 thereby indicating that the read request is a read hit, or otherwise, that the read request is a read miss. If the read request is a read hit indicating that the read request may be serviced using data already in cache 2208, the HA 2206 retrieves the read request data from the cache 2208 in step S12A and returns the requested read data to the host 2202 in step S16. Alternatively, if the read request is a read miss, processing may be performed to retrieve the data from physical storage, store the requested read data in cache, and then return the cached read data to the host. In connection with read miss processing, the HA 2206 may request S12 that a back-end component, such as the DA 2210, retrieve the requested data from physical storage device 2212. It should be noted that in performing S12, whereby the HA 2206 issues the request for the DA 2210 to retrieve the requested read data, such a request may be communicated or issued to the DA 2210, directly or indirectly, in any suitable manner that may vary with the embodiment of the data storage system. For example, the request may be communicated indirectly, such as through global memory, communicated directly from the HA to the DA such as a through a messaging layer and associated fabric, and the like. In any case, the DA 2210 retrieves the requested read data from physical storage device 2212 in step S13. The DA 2210 may store the read data in cache 2208 in step S14. The HA 2206 may then retrieve the read data in step S15 from the cache 2208 and then return the requested read data (as retrieved from cache) to the host 2202 in step S16.

Requests to read and/or write data, such as for I/O operations received by an HA from the host, identify a location of where data is read from or written to, where such location is expressed in terms of a LUN and LUN offset (e.g., LBA or logical block address) in the LUN's logical address space. Data for the LUN and LUN offset is stored at a physical storage location on a physical device (PD). Thus, the LUN and LUN offset may be mapped by the data storage system to a physical device (PD) and location on that PD when reading data from and/or writing data to that LUN and LUN offset. For example, a DA may map the LUN and LUN offset to a corresponding PD and location on the PD.

In at least one embodiment, the maximum data or payload size of a single host I/O (or more generally I/O issued from an external client to the data storage system) may be a single track of 128 KB. In such an embodiment, the block size may be 512 bytes and the maximum number of 512 byte data blocks of a single write I/O operation (maximum number of write data blocks or payload) is 256. Thus, an embodiment may allocate suitable buffers, other memory, and structures for use with techniques herein to accommodate the maximum number of 256 blocks (e.g., 256 512-byte data blocks and associated metadata). In such an embodiment, the target logical address of an I/O command or operation may denote the LUN and also the LBA corresponding to a logical address of a particular logical data block.

Figure 2F:
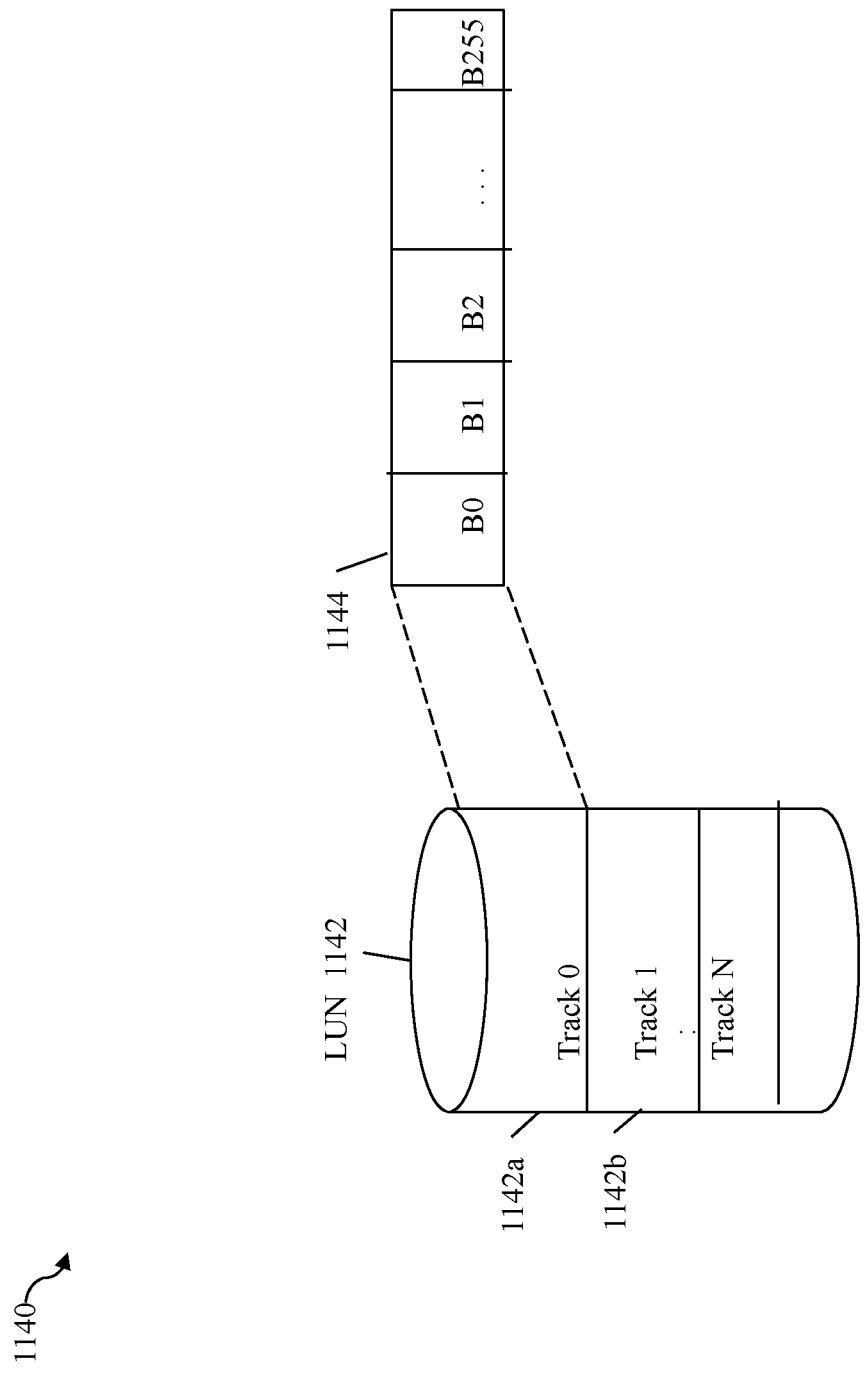
FIG. 2F is a logical representation of tracks of data stored on a logical device or LUN in an embodiment in accordance with the techniques herein.

With reference to the example 1140 of FIG. 2F, in at least one embodiment, the logical address space of a LUN 1142 may be partitioned into logically contiguous tracks, such as the N tracks of 1142, where each of the N tracks of LUN may correspond to a different group of 256 logically contiguous blocks. For example, as illustrated by 1144, track 0 1142a may include the first 256 logically contiguous blocks of data (e.g., LBA 0 through 255) of the LUN 1142. In a similar manner, track 1 1142b may include the next 256 logically contiguous blocks of data (e.g., LBAs 256-511) of the LUN 1142, and so on, for subsequent remaining ones of the N tracks of the LUN 1142. The I/O operation, such as a read or write operation, may identify a target logical address that is a combination of the particular LUN and one or more target LBAs or blocks to which the I/O operation is directed (e.g., the I/O operation may read or write one or more blocks of data). The I/O operation may indicate the target logical address in any suitable manner in the I/O operation, such as using a starting LBA and a size or length (whereby the I/O operation has an ending logical address/LBA computed by adding the size or length, minus 1, to the starting LBA).

Figure 3:
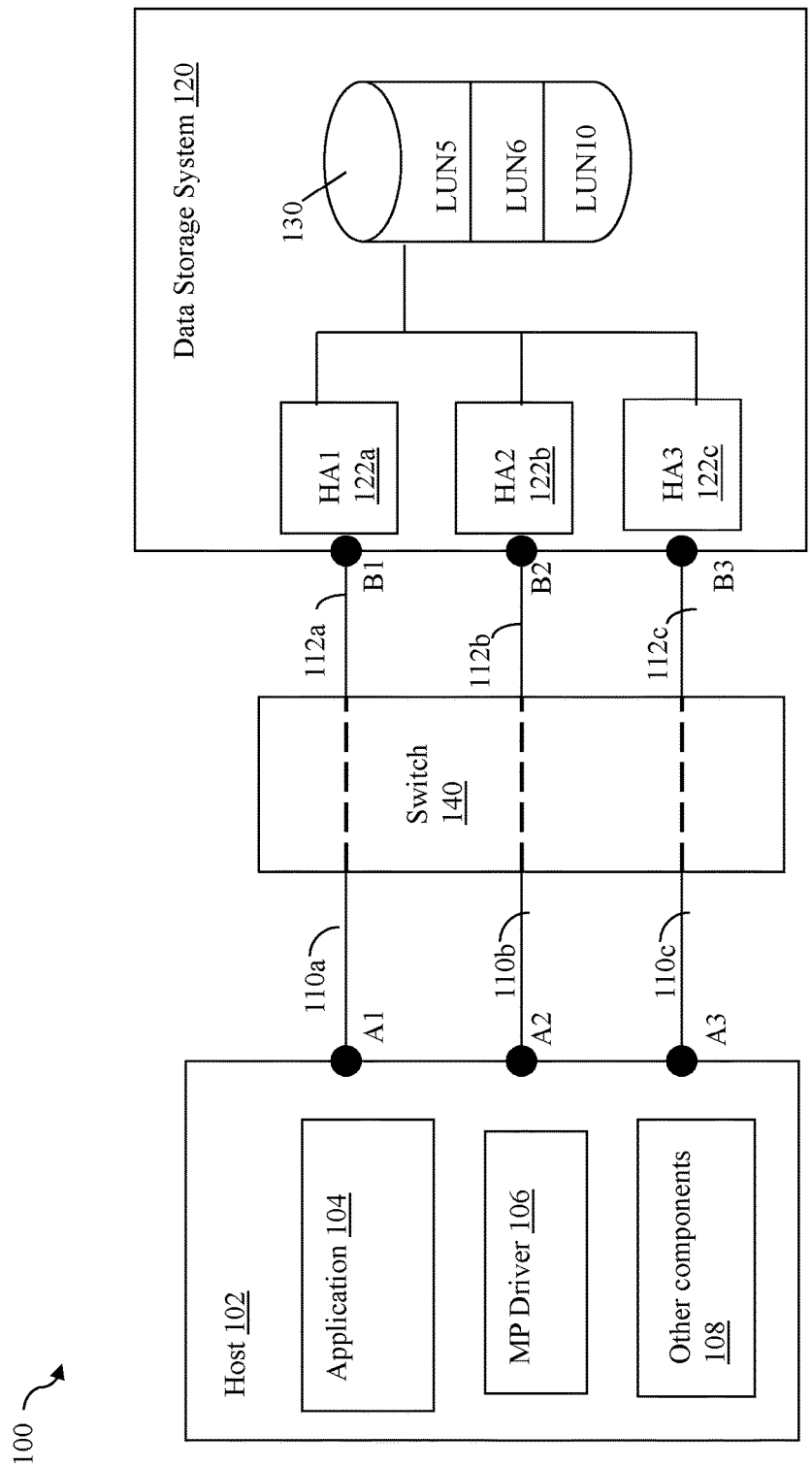
FIG. 3 is an example of systems and components that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical storage device of the data storage system 120, such as a rotating disk drive, flash-based or other solid state storage device, and the like, where the physical storage device 130 may be configured to include 3 LUNs—LUN5, LUN6 and LUN10. It should be noted that the example 100 includes only a single host, single physical device 130 with 3 LUNs, a single data storage system, and a fabric including a single switch for purposes of simplicity to illustrate the techniques herein. For example, each of the LUNs may be configured to have storage provisioned from multiple different physical devices rather than a single physical device, and multiple hosts having multiple applications executing thereon may communicate with the data storage system.

It should be noted that following paragraphs and examples may refer to a particular examples using switch 140 having a switching fabric for simplicity of illustration, element 140 may be a single switch having a switching fabric, a multi-switch having a multi-switch fabric and the like. Thus, element 140 may more generally denote a network having its own connectivity fabric or network fabric where the network may include one or more components providing the connectivity between the host 102 and data storage system 120.

The host 102 may include an application 104, a multi-path (MP) driver 106 and other components 108 whereby element 108 may also include one or more other device drivers and other code. An I/O operation from the application 104 may be communicated to the data storage system 120 using the MP driver 106 and one or more other components represented by element 108. The application 104 may be a database or other application which issues data operations, such as I/O operations, to the data storage system 120. Each of the I/O operations may be directed to a target device, such as one of the LUNs of device 130, configured to be accessible to the host 102 over multiple physical paths. As such, each of the I/O operations may be forwarded from the application 104 to the data storage system 120 over one of the possible multiple paths. The MP driver 106 may include functionality to perform any one or more different types of processing such as related to encryption, multipathing, mirroring, migration, and the like. For example, the MP driver 106 may include multipathing functionality for management and use of multiple paths. For example, the MP driver 106 may perform path selection to select one of the possible multiple paths based on one or more criteria such as load balancing to distribute I/O requests for the target device across available active paths. Load balancing may be performed to provide for better resource utilization and increased performance of the host, data storage system, and network or other connection infrastructure. The MP driver 106 may be included a commercially available product such as, for example, Dell® EMC® PowerPath® software by Dell Inc. The host 102 may also include other components 108 such as one or more other layers of software used in connection with communicating the I/O operation from the host to the data storage system 120. For example, element 108 may include Fibre Channel (FC), SCSI and/or NVMe drivers, a logical volume manager (LVM), and the like. It should be noted that element 108 may include software or other components used when sending an I/O operation from the application 104 where such components include those invoked in the call stack above the MP driver 106 and also below the MP driver 106. For example, application 104 may issue an I/O operation which is communicated in a call stack including an LVM, the MP driver 106, and an FC, SCSI or NVMe driver. This is described in more detail below such as with a subsequent figure.

The data storage system 120 may include one or more physical data storage devices, such as device 130, where each such physical device may be configured to store data of one or more LUNs as described above. Each of the LUNs having data stored on the device 130 may be configured to be accessible to the host through one or more paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the MP driver 106 may also perform other processing, such as described in more detail in following paragraphs, in addition to load balancing in connection with path selection. The MP driver 106 may be aware of, and may monitor, all paths between the host and the LUNs of the device 130 in order to determine which of the multiple paths are active or available at a point in time, which of the multiple paths are unavailable for communications, and to use such information to select a path for host-data storage system communications.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a port of an HA of the data storage system 120. Each of the LUNs of the device 130 may be accessible over three paths—a first path represented by A1-B1, a second path represented by A2-B2 and a third path represented by A3-B3.

Figure 4:
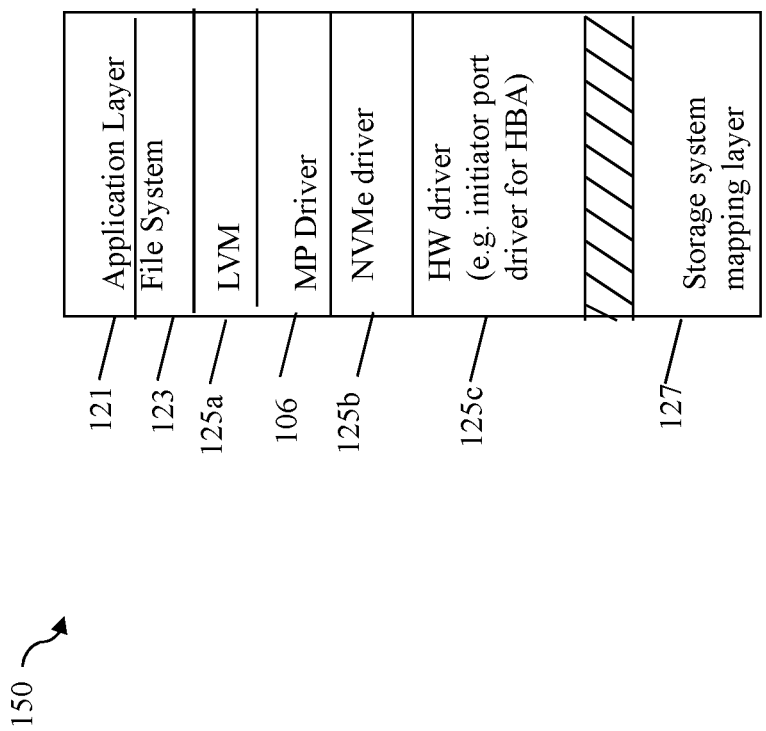
FIG. 4 is an example of different software layers that may be included in a host and data storage system in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the MP driver 106 of FIG. 3. The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be the MP (multipath) driver 106 which handles processing of the I/O received from layer 125a. The MP driver 106 may include a base driver and one or more driver extension modules. The MP driver 106 may be included in a commercially available product such as Dell® EMC® PowerPath® software. Functionality for performing multipathing operations such as may be performed by Dell® EMC® PowerPath® software may be included in one of the driver extension modules such as a multipath extension module. As described above, the MP driver may perform processing in connection with multiple path management and selecting one of a plurality of possible paths for use in connection with processing I/O operations and communicating with the data storage system, such as 120 of FIG. 3. More generally, one or more layers between the application layer 121 and the MP driver 106 may provide for mapping a LUN (such as used in connection with block-based storage) presented by the data storage system to the host to another logical data storage entity, such as a file, that may be used by the application layer 123. Below the MP driver 106 may be the NVMe driver 125b and a hardware (HW) driver 125c. The NVMe driver 125b may handle processing of a received I/O request from the MP driver 106 such as related to forming a request in accordance with the NVMe standard. The driver 125c may be a HW driver that facilitates communication with hardware on the host. The driver 125c may be, for example, a driver for an HBA of the host which sends commands or requests to the data storage system and also receives responses and other communications from the data storage system.

It should be noted that an embodiment may also include mapping layers as in FIG. 4 with a variation that the ordering of the MP driver 106 and NVMe driver 125b may be reversed.

In some embodiments, the data storage system 120 of FIG. 3 may be an intelligent data storage system having its own mapping layer 127 such that the LUN known or exposed to the host may not directly correspond to a physical device such as a disk drive. In such embodiments, the LUN specified by the host in the command associated with the I/O operation may be further mapped by the data storage system using its mapping layer 127. For example, a LUN specified by the host may be mapped by the data storage system to one or more physical drives, multiple LUNs may be located on a same physical device, multiple physical drives, and the like. In other embodiments, the data storage system may not include such a mapping layer 127.

The MP driver 106, as well as other components illustrated in FIG. 4, may execute in kernel mode or other privileged execution mode. In one embodiment using a Unix-based operating system, the MP driver 106 may executed in kernel mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, and the like. Additionally, the host may provide a virtualized environment and may execute, for example, VMware ESX or VMware ESXi software providing bare metal embedded hypervisors.

In operation, an application executing at application layer 121 may issue one or more I/O operations (e.g., read and write operations) to logical volumes (implemented by the LVM 125a) or files (implemented using the file system 123) whereby such I/O operation may be then mapped to data operations directed to LUNs of the data storage system. Such I/O operations from the application layer 121 may be directed to the MP driver 106 after passing through any intervening layers such as layers 123 and 125a.

In connection with an embodiment in accordance with techniques herein, communications between an initiator port of the host and a target port of a data storage system (e.g., target port of an HA) may include those related to I/O operations and other non-I/O commands such as related to host control operations. I/O operations may include, for example, read and write operations with respect to data stored on a LUN. More generally, the initiator port may be characterized as an initiator or sender of an I/O operation, and the target port may be characterized as a target or receiver of the I/O operation.

A path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

In connection with some protocols such as NVMe, each path as related to sending and receiving of I/O commands may include 2 endpoints. As discussed above, the host, or port thereof, may be an initiator with respect to I/Os issued from the host to a target port of the data storage system. In this case, the host and data storage system ports are examples of such endpoints. In connection with the NVMe protocol, communication of I/O operations or other commands may be bidirectional in that either endpoint may act as an initiator and either endpoint may act as a target.

The following paragraphs describe novel techniques that may be used in connection with providing additional I/O-related information in order to facilitate processing of an I/O command, such as a read command or a write command.

In at least one embodiment, the I/O command may be sent from a host, or more generally, a client, to a data storage system that performs processing to service the I/O command. In such an embodiment, the client is external with respect to the data storage system.

In at least one embodiment, the I/O command may be sent from a client that is internal within the data storage system to an I/O subsystem or component, such as a backend disk controller (also sometimes referred to as a disk adapter or director). For example, an internal client of the data storage system may include code that performs processing for a data storage service or function where such code may be internally located within the data storage system.

The I/O command may be a block-based I/O command directed to a logical device or LUN and a logical address, such as a logical block address (LBA). The LBA may denote a logical address or location on the logical device. The logical device may be configured and provisioned from physical non-volatile storage of one or more backend physical storage devices of the data storage system.

The techniques may be implemented in an embodiment that uses the NVMe protocol which includes support for I/O flags for read and write commands. For NVMe, to enable communication between each back end controller or director and the physical storage devices that it controls, the storage system may include a PCIe switch connecting the physical storage device to the controlling disk controller or director.

The read and write commands may be block-based commands directed to a LUN and one or more LBAs indicated in the commands. A read command may read data and/or metadata from the LUN and LBAs indicated in the read command. A write command may write data and/or metadata to the LUN and LBAs indicated in the write command. Additionally, the I/O command, such as the read or write command, may include an I/O flag that may be characterized as providing a hint regarding the expected usage of the data that is read or written by the I/O command. The I/O flag may be one of multiple predetermined or predefined I/O flags. The particular I/O flag specified for the I/O may be read and interpreted by the receiver of the command, such as the data storage system and the physical storage devices of the data storage system, in order to take one or more particular actions based on the specified I/O flag. For example, in at least one embodiment, the specified I/O flag related to expected read frequency may affect or alter the amount of time the data of the I/O operation remains in the cache. In at least one embodiment, the specified I/O flag related to write frequency may affect when the data of the I/O operation is destaged from the cache to the backend PDs. Thus, the I/O flag generally provides a hint to the receiver, such as the data storage system or component of the data storage system, in order to allow the receiver to perform processing responsive to the particular I/O flag value included in an I/O operation with respect to the target location identified in the I/O operation.

At least one embodiment in accordance with the techniques herein may operate in accordance with the NVMe protocol as described, for example, in the NVM Express™ Base Specification, Revision 1.4, Jun. 10, 2019, available at nvmexpress.org/wp-content/uploads/NVM-Express-1_4-2019.06.10-Ratified.pdf. The following paragraphs may provide examples of particular values and I/O flags used in one particular version of the NVMe protocol. However, more generally, the techniques herein may be used in connection with any version of any suitable protocol in which I/O flags may be included in I/O commands to provide hints in connection with the expected access frequency of the data stored on a LUN and one or more LBAs identified in a particular I/O command.

In at least one embodiment operating in accordance with the NVMe protocol, the read command may support the following I/O flags related to expected access frequency regarding data that is read from a target location (e.g., LUN, one or more LBAs) by a particular read command including one of the I/O flags. The target location may be the logical address location expressed in terms of LUN and one or more LBAs of the read command. The I/O flag value may be included in a field of the read I/O command. The following are I/O flags supported for a read command in at least one embodiment:

Value Definition
 0 No frequency information provided.
 1 Normal or typical number of reads and writes expected for this LBA range.
 2 Infrequent writes and infrequent reads to the LBA range indicated.
 3 Infrequent writes and frequent reads to the LBA range indicated.
 4 Frequent writes and infrequent reads to the LBA range indicated.
 5 Frequent writes and frequent reads to the LBA range indicated.
 6 One time read. E.g., command is due to virus scan, backup, file copy, or archive.
 7 Speculative read. The command is part of a prefetch operation.
 8 The LBA range is going to be overwritten in the near future.

In at least one embodiment, read commands with an I/O flag of 0 or 1 may not result in the data storage system varying the normal or typical cache management techniques or destaging processing (e.g., to write out cached WP data to backend PDs) used with respect to the read data stored in the cache. Read commands with an I/O flag associated with infrequent reads (e.g., I/O flag=2, 4) or one time reads (e.g., I/O flag=6) may result in the cache management technique performing processing to reduce the amount of time the read data remains in the cache (e.g., relative to the amount of time the read data remains in the cache when the read data has a normal or frequent expected access frequency) thereby making the cache slot containing such read data available sooner for other uses within the data storage system. Read commands with an I/O flag associated with frequent reads (e.g., I/O flag=3, 5) may result in the cache management technique performing processing to increase the amount of time the read data remains in the cache (e.g., relative to the amount of time read data remains in the cache when the read data has a normal or infrequent expected access frequency). Retaining frequently read data in the cache is desirable in order to increase cache read hits and thus I/O performance.

Read commands with an I/O flag associated with infrequent writes (e.g., I/O flag=2, 3) may affect when such data, when marked as WP, is destaged from the cache. A cache page or slot including such infrequently written WP data may be destaged at any suitable time since additional writes or modifications to the data are expected infrequently. In contrast, now consider read commands with an I/O flag associated with frequent writes (e.g., I/O flag=4,5) that may also affect when such data, when marked as WP, is destaged from the cache. A cache page or slot including such frequently written data may have its destaging delayed since additional writes or modifications to the data are expected frequently. As such, target logical addresses of WP data expected to be further written frequently (e.g. I/O flag=4, 5) may have destaging delayed, such as to wait a specified amount of time prior to destaging, since further writes to the target logical addresses are imminently expected. In contrast, other target logical addresses, such as those that are infrequently written (e.g., I/O flag=2, 3), or those that have a normal or typical write access frequency (e.g. I/O flag=1), may be scheduled for destaging once the cached data of the target logical address is modified and becomes WP.

In at least one embodiment, the write command may support the following I/O flags related to expected access frequency regarding data that is written to a target location by a particular write command including one of the I/O flags. The target location may be the logical address location expressed in terms of LUN and one or more LBAs of the write command. The I/O flag value may be included in a field of the write I/O command. The following are I/O flags supported for a write command in at least one embodiment:

Value Definition

0 No frequency information provided.

1 Typical number of reads and writes expected for this LBA range.

2 Infrequent writes and infrequent reads to the LBA range indicated.

3 Infrequent writes and frequent reads to the LBA range indicated.

4 Frequent writes and infrequent reads to the LBA range indicated.

5 Frequent writes and frequent reads to the LBA range indicated.

6 One time write.

In at least one embodiment, write commands with an I/O flag of 0 or 1 may not result in the data storage system varying the normal or typical cache management techniques and destaging processing (e.g., to write out cached WP data to backend PDs) used with respect to the read data stored in the cache. Write commands with an I/O flag associated with infrequent reads (e.g., I/O flag=2, 4) may result in the cache management technique performing processing to reduce the amount of time the data remains in the cache (e.g., relative to the amount of time other data, having a normal or frequent expected access frequency, remains in the cache) thereby making the cache slot containing such the data available for other uses within the data storage system. Write commands with an I/O flag associated with frequent reads (e.g., I/O flag=3, 5) may result in the cache management technique performing processing to increase the amount of time the data remains in the cache (e.g., relative to the amount of time other data, having a normal or infrequent expected access frequency, remains in the cache).

Write commands with an I/O flag associated with infrequent writes (e.g., I/O flag=2, 3) may affect when such data, when marked as WP, is destaged from the cache. A cache page or slot including such infrequently written data may be destaged at any suitable time since additional writes or modifications to the data are expected infrequently. In contrast, now consider write commands with an I/O flag associated with frequent writes (e.g., I/O flag=4,5) that may also affect when such data, when marked as WP, is destaged from the cache. A cache page or slot including such frequently written data may have its destaging delayed since additional writes or modifications to the data are expected frequently. As such, target logical addresses of WP data expected to be further written frequently (e.g. I/O flag=4, 5) may have destaging delayed, such as to wait a specified amount of time prior to destaging, since further writes to the target logical addresses are imminently expected. In contrast, other target logical addresses, such as those that are infrequently written (e.g., I/O flag=2, 3), or those that have a normal or typical write access frequency (e.g. I/O flag=1), may be scheduled for destaging once the cached data of the target logical address is modified and becomes WP.

The techniques described in following paragraphs propose new usages of particular ones of the I/O flags described above for application level integration and for I/O commands issued in connection with internal data storage system operations and processing.

What will now be described is a first use case of the techniques herein, also sometimes referred to herein as case A, leveraging application-level knowledge for better data storage system I/O processing. For example consistent with other discussion herein, a host may issue I/Os to the data storage system. The I/Os may be issued by a driver such as the multipath I/O driver (MP driver) on the host. The I/Os may originate from an application on the host where such I/Os are then passed down the I/O stack of the data path to the driver. The application may be, for example, a database application that writes database user data (e.g., data stored in the database) on a first LUN of the data storage system. The database application may also write information to a data transaction log (also sometimes referred to as a data log or log) on a second LUN of the data storage system. In connection with using a log to perform write logging, the database application may log or record, in the log, each write or modification to the database's data. In connection with a database transaction, a single transaction may include multiple writes where the single transaction is committed and performed atomically as a single operation. In at least one embodiment, the multiple writes of each transaction may be written to the log prior to committing the transaction and thus prior to actually updating the database's data. The writes recorded in the log may be written incrementally to sequential records or logical locations within the log. In at least one embodiment, the log (e.g., implemented as a log file or log device) may be written to in a circular manner so that when the last record of the log file is written, logging of writes may continue with the beginning of the log file. Thus, the log is typically written to sequentially by the database application. The log file may be used for any suitable purpose such as, for example, perform recovery of data stored in the database upon a database corruption, and the like.

In at least one embodiment, the MP driver that receives the I/Os from the database application is able to identify which of the I/Os are directed to the second LUN used as the log device for the database application. The log device may be used with storing the data transaction log of the database application. The MP driver is also able to identify whether the I/Os received from the application (e.g., as part of the runtime call stack of the I/O or data path) are reads or writes and also the size or amount of data that is read or written by the I/O command. In connection with the techniques herein, the MP driver may identify read commands directed to the log device of the database application, where such read commands may be characterized as long or large read commands that read an amount of data (e.g., payload) exceeding a specified threshold. In at least one embodiment, the database application may perform processing that includes reading its data log from the log device, for example, to verify the log consistency and completeness. Such processing may, for example, including issuing reads for large amounts of data of the log file. In at least one embodiment, the data may be read generally in logical sequential order as stored in the log file.

For such read commands that read from the log device of the database application, where such read commands read large amounts of data, the MP driver may set the read command I/O flag to 6 since the read is expected to be a one-time read. The data storage system may receive the read command including the read command I/O flag of 6 and perform special read processing that varies from the typical read I/O data path processing and that may vary the cache management with respect to the data of the read command having the I/O flag=6. For example, in at least one embodiment, the data storage system may not retain the read data in the cache. Once the read data has been stored in the cache and returned to the requesting host or other client, the read data may be removed or evicted from the cache, or otherwise immediately marked for removal or eviction from the cache. For example, the cache slot including the read data may be marked as free or available for use in connection with other processing operations. In at least one embodiment, responsive to receiving a read command with the I/O flag=6 that reads data from a target location, the data storage system may generally use any suitable technique to accelerate removal of the read data of the target location from the cache.

In at least one embodiment, the database application on the host may perform processing to read the data from the log device, such as the second LUN noted above, in connection with performing verification and consistency checking of the log device data. For example, in at least one embodiment, such processing to validate the data of the log device may utilize metadata (MD) stored along with the data on the log device. The MD used in connection with validating may include, for example, a checksum value, a CRC (cyclic redundancy check) value, or other information describing the application's log data stored on the LUN or log device. For example, the checksum may be used to verify or validate the stored log data's validity when read from physical non-volatile storage, for example, to ensure there has not been user data corruption or error in connection with obtaining the user data from the physical storage. In at least one embodiment, a checksum may be characterized a count of the number of bits in a transmission unit that is included with the unit so that the receiver can check to see whether the same number of bits arrived. If the counts match, processing may determine that the complete transmission was received and there has been no error in the data transmitted.

In at least one embodiment, the checksum associated with a chunk of data written to the log device may also be stored on the log device along with the chunk of data. The checksum may be used verify the integrity of the data chunk stored on the log device. For example, first data may be written to the log device along with a first checksum value determined based on the first data. As part of verification and consistency checking, the host may read the first data and the first checksum stored on the log device of the data storage system. The host may calculate a checksum for the first data as read from the log device of the data storage system. The calculated checksum may be compared to the first checksum read from the log device. If the calculated checksum and the first checksum read from the log device match, then processing may determine that the first data is valid and consistent. Otherwise, if the calculated checksum and the first checksum read from the log device are different, then processing may determine that the first data is inconsistent and has failed the verification and consistency processing. If the calculated checksum and the first checksum read from the log device are different, it may indicate that the first data stored on the log device has been corrupted or otherwise has been compromised.

A CRC value as noted above for a data chunk is another type of value that may be used in connection with detecting and correcting errors or inconsistencies in a data chunk. The CRC is generally based on division where the input data is interpreted as a binary bit stream (e.g., dividend) that is divided by another fixed binary number (e.g., divisor). The remainder of this division is the CRC value. The binary numbers used as the dividend and divisor are treated as binary polynomials where the bits of such binary numbers are used as coefficients of the polynomials. The divisor may also be referred to as a generator polynomial that is statically defined using the CRC algorithm, where CRC-n denotes use of a fixed defined generator polynomial with "n+1" bits. Generally, the CRC may be defined as the remainder after repeatedly performing XOR operations using the generator polynomial or divisor. Thus, an existing CRC value may be stored in the MD along with the data chunk such as when writing the data chunk to the log device. Subsequently, for example, when the data chunk is read from the data storage system and sent to the database application performing the verification and consistency checking of the log device data, the data chunk read may be used to again calculate a CRC value based on the data chunk read. If the calculated CRC value does not match the existing CRC value of the MD, there is an inconsistency, such as a data corruption, of the data chunk stored on the log device of the data storage system (e.g., the content of data chunk, as stored on the log device is inconsistent with respect to its associated CRC value as also stored on the log device).

What will now be described in connection with the first case, case A, is an example of how the MP driver may be used in connection with setting the I/O flag=6 for read I/O operations for reads to database log devices. In at least one embodiment, the MP driver on the host may receive each I/O for processing prior to sending the I/O to the data storage system for servicing. The processing performed by the MP driver may include determining when a read I/O operation is from a database application where the read I/O exceeds a minimum threshold size, and is a read to a log device of the database application. Further, in at least one embodiment, the MP driver may determine that the read operation that is a part of a detected sequential read access pattern to the log device.

In at least one embodiment, the MP driver may detect when a read I/O operation is to a log device based on the application process name. For example, the application process that issued the read operation may have a process name including a predetermined string, such as "LOGREADER". From this, the MP driver may determine that the read I/O is directed to a log device or LUN. In at least one embodiment, based on the process name, the MP driver may determine that the log device is being read from by a database application including a process with the particular process name. Once the MP driver detects the foregoing for a read operation exceeding a specified threshold size, the MP driver may set the I/O flag, of the read operation, to 6. When the read I/O is received on the data storage system from the host, the data storage system may use the I/O flag to affect the caching of the read I/O data on the data storage system. For example, as discussed elsewhere herein, the read I/O data with an I/O flag=6 may be removed from the cache immediately after the read I/O data has been obtained from the cache and returned to the requesting host.

Referring back to FIG. 3, an application such as the application 104 of the host 102, may include multiple processes each having a different process name. For example, the application 104 may be a database (DB) application which includes a first DBWRITER process that writes to the database (DB) stored on the data storage system, a second LOGWRITER process that writes to a log to log the database modification operations (e.g., writes to the database log device), and a third LOGREADER process that reads data from the database log device. The MP driver 106 on the host 102 receives the I/Os originating from the foregoing three processes of the DB application whereby the MP driver knows which process originates each I/O it receives and then sends to the data storage system for processing.

In at least one embodiment in accordance with techniques herein, each process name for an application process (e.g., such as each of the above-noted first and second processes) includes multiple portions comprising a first portion and a second portion. In at least one embodiment, the first portion may denote the particular application process, such the above-noted LOGWRITER process that writes to the log device for the database instance, the above-noted DBWRITER process that writes to the database, or the above-noted LOGREADER process that reads from the log device of the database application instance. The second portion of each process name may be an application instance specifier or identifier (ID). In at least one embodiment, the second portion of the process name may be customized for each application instance and may be user-specified or user configurable for each process of the particular application instance. For example, there may be two different instances of the same DB application executing on the same host. The two instances may be different instances of the same vendor-provided DB application. The first DB application instance may be used for marketing by the marketing department and the second DB application instance may be used for sales by the sales department.

Figure 5:
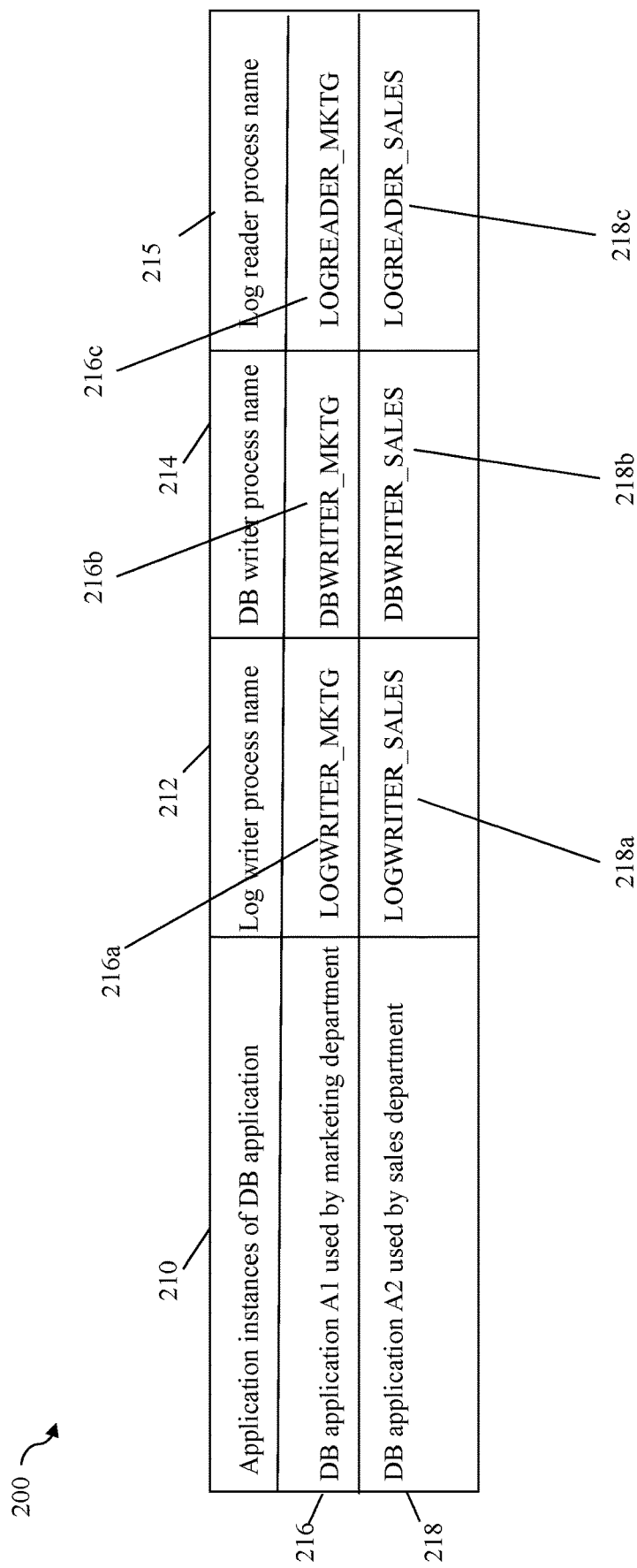
FIG. 5 is an example illustrating process names on a host in an embodiment in accordance with the techniques herein.

To further illustrate and referring now to FIG. 5, table 200 includes a first column 210 of application instances of the DB application, a second column 212 of log writer process names, a third column of DB writer process names, and a fourth column 215 of log read process names. Row 216 denotes the process names for the first DB application instance A1 and row 218 denotes the process names for the second DB application instance A2. The first instance A1 of the DB application used by marketing may have a LOGWRITER process with the process name of LOGWRITER_MKTG 216*a*, where "LOGWRITER" is the first portion of the process name and "MKTG" (denoting marketing) is the second portion of the LOG writer process name. The first instance A1 of the DB application used by marketing may have a DBWRITER process with the process name of DBWRITER_MKTG 216*b*, where "DBWRITER" is the first portion of the process name and "MKTG" (denoting marketing) is the second portion of the DB writer process name uniquely identifying the first instance of the DB application thereby enabling distinguishing between the first and second instances of the same DB application (e.g., such as between two instances of the DB application by the same DB vendor, such Oracle Corporation). The first instance A1 of the DB application used by marketing may have a LOGREADER process with the process name of LOGREADER_MKTG 216*c*, where "LOGREADER" is the first portion of the process name and "MKTG" (denoting marketing) is the second portion of the LOG reader process name.

In a similar manner, the second instance A2 of the DB application used by sales may have a second LOGWRITER process with the process name of LOGWRITER_SALES 218*a*, where "LOGWRITER" is the first portion of the process name and "SALES" (denoting sales) is the second portion of the LOGWRITER process name. The second instance A2 of the DB application used by sales may have a DBWRITER process with the process name of DBWRITER_SALES 218*b*, where "DBWRITER" is the first portion of the process name and "SALES" (denoting sales) is the second portion of the DBWRITER process name uniquely identifying the second instance of the DB application (thereby enabling distinguishing between the first and second instances of the same DB application). The second instance A2 of the DB application used by sales may have a second LOGREADER process with the process name of LOGREADER_SALES 218*c*, where "LOGREADER" is the first portion of the process name and "SALES" (denoting sales) is the second portion of the LOGREADER process name.

In this manner, the process name may include a first portion denoting the specific process of a particular application, and the second portion may further denote a particular unique instance of the specific process (as denoted by the first portion). Both DB application instances A1 and A2 are sending reads and/write I/O operations to log files and use of 216*a*, 218*a* allows for distinguishing between the particular application process instance (sales or marketing) of the LOGWRITER process of the DB application instance issuing I/Os. Similarly, both DB application instances A1 and A2 are sending reads and/or write I/O operations to the DB and use of 216*b*, 218*b* allows for distinguishing between the particular application process instance (sales or marketing) of the DBWRITER process issuing such DB I/Os. Similarly, both DB application instances A1 and A2 are sending reads and/or write I/O operations to the DB and use of 216*c*, 218*c* allows for distinguishing between the particular application process instance (sales or marketing) of the LOGREADER process issuing such DB I/Os.

In connection with the techniques herein, the MP driver may determine when reads above a specified threshold are issued from a particular process having an associated name including the predetermined string, such as "LOGREADER". Thus, for example, the MP driver may determine when reads are issued by a process having the process name 216*c* or 218*c* that includes the predetermined string such as "LOGREADER". In at least one embodiment, the MP driver may also perform processing to detect a sequential read I/O pattern directed to the log device of the database application. For example, the MP driver may determine that a sequence of logically consecutive addresses of a log device are accessed and appropriately set the I/O flag=6 for such read I/Os, where such read I/Os are from a LOGREADER process (e.g., 216*c* or 218*c*) and where such read I/Os each read an amount of data exceeding a specified threshold size.

Figure 6:
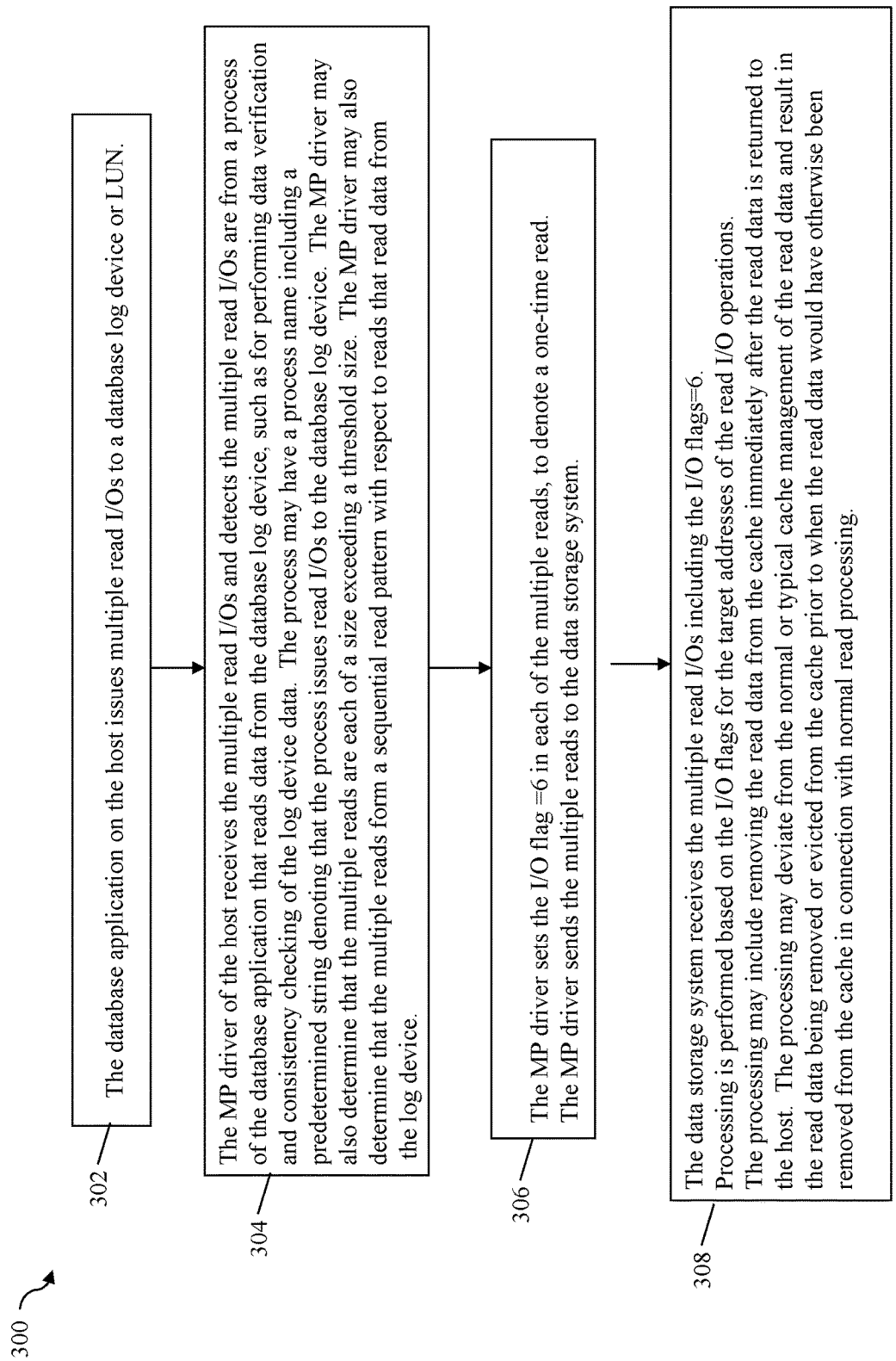
FIGS. 6 and 7 are flowcharts of processing steps that may be performed in an embodiment in accordance with the techniques herein.

Referring to FIG. 6, shown is a flowchart of processing steps that may be performed in an embodiment in accordance with the techniques herein for the first use case A. The flowchart 300 summarizes processing described above. At the step 302, the database application on the host issues multiple read I/Os to a database log device or LUN. From the step 302, control proceeds to the step 304.

At the step 304, the MP driver of the host receives the multiple read I/Os and detects the multiple read I/Os are from a process of the database application that reads data from the database log device, such as for performing data verification and consistency checking of the log device data. The process may have a process name including a predetermined string denoting that the process issues read I/Os to the database log device. The MP driver may also determine that the multiple reads are each of a size exceeding a threshold size. The MP driver may also determine that the multiple reads form a sequential read pattern with respect to reads that read data from the log device. From the step 304, control proceeds to the step 306.

At the step 306, processing is performed responsive to the step 304 where the MP driver determines that the reads are issued by the process of the database application that reads data from the database log device and where each of the reads read an amount of data exceeding the threshold size. In the step 306, the MP driver sets the I/O flag=6 for each of the multiple reads to denote each of the read I/Os as a one-time read of the data stored at the target location of read I/O. The MP driver then sends the multiple reads to the data storage system. From the step 306, control proceeds to the step 308.

At the step 308, the data storage system receives (from the host) the multiple read I/Os including the I/O flags=6. Processing is performed based on the I/O flags for the target addresses of the read I/O operations. The processing may include removing the read data from the cache immediately after the read data is returned to the host. The processing may deviate from the normal or typical cache management of the read data and result in the read data being removed or evicted from the cache prior to when the read data would have otherwise been removed from the cache in connection with normal read processing. In this manner, the cache resources of the data storage system may be used more efficiently and made available for other uses rather than storing read data that is not expected to be read again in the near future.

What will now be described is a second use case of the techniques herein, also sometimes referred to herein as case B. In the case B, the data storage system may perform processing in connection with verifying the correctness of metadata associated with user data (e.g., application data or more generally data stored by the data storage system clients) stored on the back end non-volatile physical storage devices. Such verification processing in connection with case B may also sometimes be referred to as backend scrubbing and verification. The verification processing of case B may use a checksum, CRC value, or other metadata as discussed elsewhere herein to verify the correctness and validation of the stored data. However, in this particular use case B, the data storage system may include code that functions as an internal data storage system client that issues I/O commands, such as read commands, to read the necessary metadata data and data stored on the backend non-volatile physical storage devices or PDs. In at least one embodiment in connection with reading the metadata and the data stored on the PDs, the read commands may be sent to the PDs with an I/O flag=6 since this metadata and data will be read once and not again by the internal data storage system client. In this case B, the data and metadata read in connection with the verification processing of the case B may not be retained in the cache. As described in connection with the case A, the data storage system may perform processing to immediately evict or remove the data and metadata read once it has been returned to, or used by, the internal data storage system client. More generally, the data and metadata read for use with case B may be removed or evicted from the cache, or otherwise immediately marked for removal or eviction from the cache. For example, the cache slot including the data and metadata may be marked as free or available for use in connection with other processing operations. The data storage system may generally perform any suitable technique to accelerate removal of the read data of the target location from the cache.

Additionally, for the metadata and data read in connection with the case B usage, the read command performance or read latency may not be as critical as other I/Os such as those issued by an external client. As such, in at least one embodiment, processing may be performed to additionally give preference to other more critical I/Os originating from external data storage system clients, such as hosts. For example, a controller or the physical drives may schedule I/O handling of the internal client read having a read I/O flag=6 to have a lower priority than other I/Os originating from external data storage system clients. In other words, in at least one embodiment, read I/Os with the I/O flag=6 indicating a one-time read may be scheduled for processing at a lower priority than other I/Os which are also not reads with an I/O flag=6. For example, higher priority may be given to processing other I/Os having an I/O flag=1.

What will now be described is a third use case of the techniques herein, also sometimes referred to herein as case C. In the case C), the data storage system may perform processing in connection with a compression or compressibility check to assess the compressibility of data. The processing of the case C may be performed offline not in connection with the I/O or data path. For example, the data storage system may perform processing with respect to data that is already stored on physical storage devices of the data storage system. The data may be currently stored in an uncompressed form. The data storage system may perform the compressibility check of the data including reading the data, and performing processing to determine the actual or estimated compression ratio of the data. The compression ratio associated with data may then be used in assessing whether to store the data on the physical storage devices in a compressed form. A compression ratio may denote a measure of the size of an original uncompressed data chunk with respect to the size of the compressed form of the data chunk. For example, if compression processing compresses a 10 MB file to 2 MB, the file has a compression ratio of 10/2=5, often notated as an explicit ratio, 5:1 (read "five" to "one"), or as an implicit ratio, 5/1. Thus, an embodiment may specify a minimum compression ratio threshold and, in order to store the data in a compressed form, processing may determine whether the actual or estimated compression ratio for the data exceeds the specified minimum compression ratio threshold. If so, the data may be characterized as compressible and may be stored in its compressed form. Otherwise, the data may be characterized as uncompressible and may not be stored in its compressed form. Generally, whether to store the data in its compressed form may be determined using multiple inputs or factors including the compression ratio of the data.

Thus, with the case C, the client issuing the read commands and performing the processing may be an internal data storage system client. When sending the read commands to read the uncompressed data to the backend physical storage devices, the backend controller may set the read command I/O flag to 6. In such an embodiment, the data may be read once and discarded immediately after processing is performed. In at least one embodiment, the read data may be stored in cache and then removed from the cache or otherwise have its cache slot marked as available or free. As a variation, an embodiment may not even stored the read data in the cache and may communicate the read data directly to the component performing the processing. Additionally, as with the case B, the read command performance or read latency for case C may not be as performance critical as other I/Os, such as an external client I/O. As with the case B, processing may be performed to additionally give preference to other more critical I/Os originating from external data storage system clients, such as hosts. For example, a controller or the physical drives may schedule I/O handling of the internal client read to have a lower priority than other I/Os originating from external data storage system clients. For example, higher priority may be given to processing other I/Os having an I/O flag=1.

What will now be described is a fourth use case of the techniques herein, also sometimes referred to herein as case D. In the case D), the data storage system may perform processing to relocate data between different physical storage devices. For example, the data storage system may be perform automated processing by a data storage optimizer that relocates data dynamically among different storage tiers of the data storage system. In at least one embodiment, the data storage optimizer may be an internal client of the data storage system that may issue read and write operations to perform such data relocations. The storage tiers may include physical storage devices having different performance characteristics. For example, a first storage tier may include flash-based drives and may be characterized as a high performance tier. A second storage tier may include physical storage devices having lower performance characteristics than the first storage tier. The second storage tier may be characterized as a lower performance storage tier in comparison to or relative to the first storage tier. The optimizer may, for example, store frequently accessed data on the higher performance first tier and less frequently accessed data on the lower performance second tier. Thus, as access frequency with respect to a data portion varies, the optimizer may relocate the data portion accordingly at different points in time between the first and the second storage tiers.

In connection with case D usage for read and writes issued by the data storage optimizer or other component relocating data between physical storage device, the controller(s) accessing the physical storage devices may set the I/O flag to 2 in connection with reading and writing data portions relocated from a source tier to a target tier. The read and write commands used in connection with case D may have the I/O flag=2 to denote infrequent read and writes. In this case D for relocation among the physical storage devices, the data portion is expected to be read once (from the current source device) and expected to be written once (to the current target device). In at least one embodiment, the read data may be stored in cache and then removed from the cache or otherwise have its cache slot marked as available or free. As a variation, an embodiment may not even stored the read data in the cache and may communicate the read data directly to the component performing the processing. Additionally, the performance of such I/Os issued in connection with case D may not be as performance critical as other I/Os, such as those issued from an external client I/O. Processing may be performed to additionally give preference to other more critical I/Os originating from external data storage system clients, such as hosts. For example, a controller or the physical drives may schedule I/O handling of the internal client I/Os with an I/O flag=2 to have a lower priority than other I/Os, such as other I/Os originating from external data storage system clients. For example, higher priority may be given to processing other I/Os having an I/O flag=1.

Also, in connection with case D write I/Os having an I/O flag=2 (infrequent writes), processing may be performed to accelerate destaging of such cached data, when WP and stored in the cache. Such data may be scheduled for destaging once the cached data of the target logical address is modified and becomes WP. This may free up a cache page or slot including the WP data sooner thereby making the cached page available for other uses.

What will now be described is a fifth use case of the techniques herein, also sometimes referred to herein as case E. In the case E), I/Os may be issued in connection with performing a processing to rebuild a RAID group member or drive. For example, in instances when there is a failure of a physical storage device that is a member of a RAID group, the data storage system may replace the failed RAID group member with a new healthy physical storage device. Subsequently, processing may be performed internally in the data storage system to perform a RAID group drive rebuild with respect to the RAID group member that is now the new storage device. Such rebuild processing may be characterized as initializing the new storage device with the necessary data to function as a RAID group member replacing the failed drive or member. With the RAIG group rebuilding procedure, processing may be performed to rebuild and recover the information of a failed RAID group drive or member using one or more of the other healthy drives or members of the RAID group. Such rebuild processing of case E is performed without requiring data recovery from a backup and performed using the health drives or members of the RAID group. For Example, a RAID-6 RAID group provides a higher level of robustness in terms of data protection than RAID-1 (e.g., RAID-6 can sustain a 2 drive member failure and perform an internal RAID group rebuild without requiring data recovery from a backup and RAID-1 (which is mirroring data) cannot). RAID-1 can sustain a single drive member failure since data written is mirrored on another drive or member of the RAID group. With RAID-1, data of a single failed drive may be recovered from the other non-failed drive mirroring the data of the failed drive. The particular rebuild processing performed may vary with the particular RAID group level and algorithm used to store the data in the RAID group. For example, when performing the rebuild processing in at least one embodiment for a RAID group, data is read from the other RAID group drives or members where the data read is then processed to determine the data to be written to the new physical storage device that replaced the failed drive. For such read and write commands issued in connection with rebuilding a RAID group member or drive of case E, the I/O flag is set to 2 to denote infrequent read and writes. For case E, the I/Os issued in connection with the rebuilding of the RAID group drive or member may be an internal data storage system client. The performance of such I/Os issued in connection with case E may not be as critical as other I/Os, such as those originating from an external client I/O. Processing may be performed to additionally give preference to other more critical I/Os originating from external data storage system clients, such as hosts. For example, a controller or the physical drives may schedule I/O handling of the internal client I/Os with an I/O flag=2 to have a lower priority than other I/Os, such as other I/Os originating from external data storage system clients. For example, higher priority may be given to processing other I/Os having an I/O flag=1.

Also, in connection with case E write I/Os having an I/O flag=2 denoting infrequent writes as well as infrequent reads, processing may be performed to accelerate destaging of such cached data, when WP and stored in the cache. Such data may be scheduled for destaging once the cached data of the target logical address is modified and becomes WP. This may free up a cache page or slot including the WP data sooner thereby making the cached page available for other uses.

What will now be described is a sixth use case of the techniques herein, also sometimes referred to herein as case F. In the case F), I/Os may be issued from an internal data storage system client as part of recovery processing. For example, when data storage system recovers from a power failure or other type of failure that caused the data storage system to shut down, the system may read previously saved data from its non-volatile storage devices in order to reboot the system and bring the system online for use. In response to a power failure, the data storage system may perform processing to shut down in an organized manner using backup power for a short time period. During this short time period, the data storage system may perform processing to store information and data, such as may be stored in a volatile memory such as cache, to non-volatile storage devices. Subsequent to this short time period and saving the necessary information and data to non-volatile storage devices, the data storage system may shut down and no longer run on its secondary or backup power. At a later point in time, the data storage system may be rebooted where it reads the previously saved information and data from the non-volatile storage devices. When reading such data from the non-volatile storage devices in connection with case F when recovering, for example, from a power failure, the backend controller or other component may set the I/O flag in I/Os sent to the array drives holding the recovery information. The I/O flag of such read I/Os may indicate that the recovery information read is expected to be infrequently read. In at least one embodiment, the I/O flag of such read I/Os may be set to a flag value of 4. In at least one embodiment, the recovery information may also be expected to be written frequently so the flag value of 4 may be selected and used to denote both the expected infrequent reading and expected frequent writing of the recovery information.

The data read in connection with I/Os of the case F may not be retained in the cache. As described elsewhere herein in connection with other use cases, the data storage system may perform processing to immediately evict or remove the data read once it has been returned to, or used by, the internal data storage system client performing the recovery processing for use case F. More generally, the data read for use with case F may be removed or evicted from the cache, or otherwise immediately marked for removal or eviction from the cache. For example, the cache slot including the data and metadata may be marked as free or available for use in connection with other processing operations. The data storage system may generally perform any suitable technique to accelerate removal of the read data of the target location from the cache.

Recovery information may also be written in connection with I/Os of the case F. When recovery information is WP in the cache, since it may be expected to be frequently written, destaging the WP recovery information may be delayed in order to possibly wait for additional modifications prior to destaging.

It should be noted that the actions performed responsive to the particular I/O flag values for the use cases described herein may vary with embodiment. Examples of actions and processing that may be performed in connection with the particular use cases are described herein.

Figure 7:
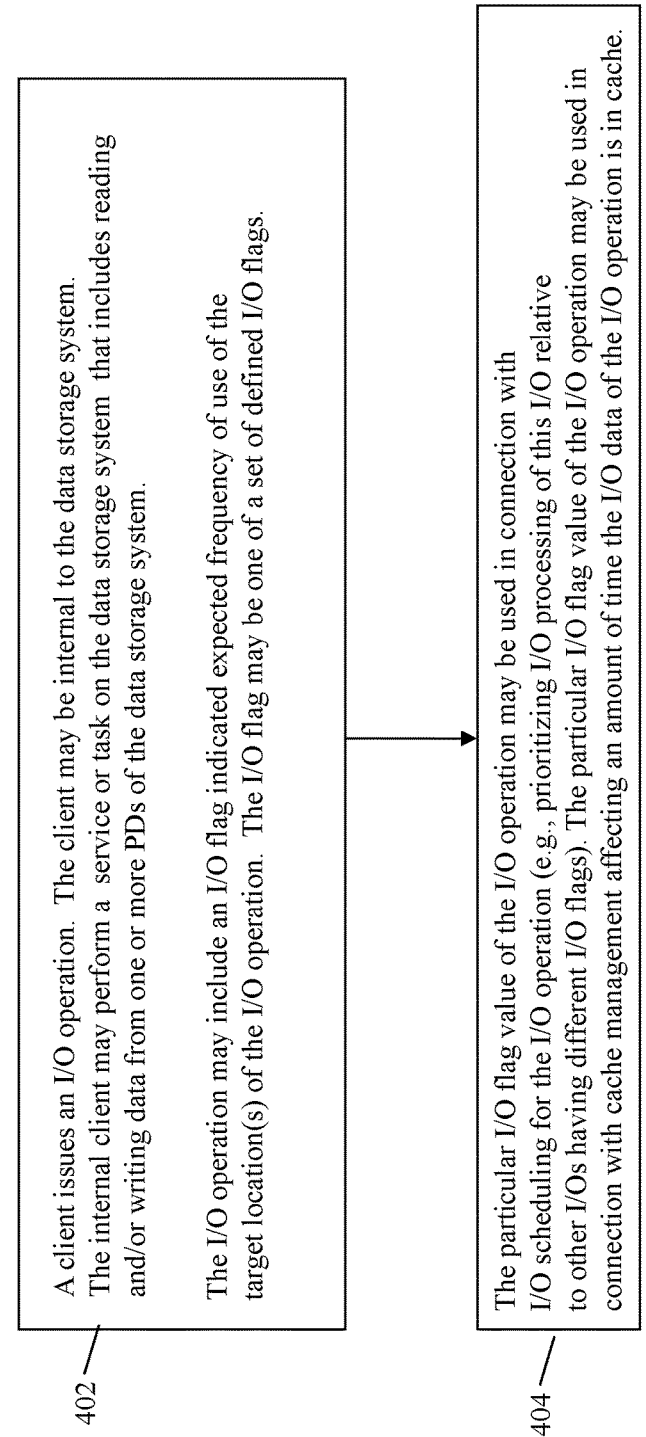

Referring to FIG. 7, shown is another flowchart 400 of processing that may be performed in an embodiment in accordance with the techniques herein. The flowchart 400 summarizes processing generally described above in connection with use cases B, C, D and E where an internal client of the data storage system issues the I/Os having associated I/O flags.

At the step 402, the client issues an I/O operation. The client may be internal to the data storage system. The internal client may perform a service or task on the data storage system that includes reading and/or writing data from one or more PDs of the data storage system. The I/O operation may include an I/O flag indicating an expected frequency of use of the target location(s) of the I/O operation. The I/O flag may be one of a set of defined I/O flags. From the step 402, control proceeds to the step 404.

At the step 404, the particular I/O flag value of the I/O operation may be used in connection with I/O scheduling for the I/O operation (e.g., prioritizing I/O processing of this I/O relative to other I/Os having different I/O flags). Also in the step 406, the particular I/O flag value of the I/O operation may be used in connection with cache management affecting an amount of time the I/O data of the I/O operation is in cache.

The techniques herein may be performed using any suitable hardware and/or software. For example, the techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing I/O operations comprising:
   issuing, by a process of an application on a host, a plurality of I/O operations;
   determining, by a driver on the host, that the plurality of I/O operations are a plurality of read operations that read first data from logical addresses of a logical device that is a block-based logical device exposed, by a data storage array to the host, over a network through at least one path between the host and the data storage array, wherein the logical device is used as a log to record writes performed by the application, and wherein the logical device is configured and provisioned from physical non-volatile storage of one or more backend physical storage devices of the data storage array;
   determining, by the driver on the host, that a read data payload of each of the plurality of read operations is larger than a specified threshold size, that the application is a database application reading data from the logical device used as a database log device, and that the plurality of read operations denote a sequential read pattern of read operations that read data from the logical device in a logical sequential order based on consecutive logical addresses of the logical device; and
   responsive to determining that a read data payload of each of the plurality of read operations is larger than the specified threshold size, that the application is the database application reading data from the logical device used as the database log device, and that the plurality of read operations denote the sequential read pattern, performing first processing comprising:
      storing, by the driver, an I/O flag in each of the plurality of read operations, wherein the I/O flag of said each read operation has a first flag value denoting an expected read frequency associated with a portion of the first data read by said each read operation;
      sending the plurality of read operations, each including the I/O flag, over the network on the at least one path from the host to the data storage array; and
      performing second processing of the plurality of read operations on the data storage array, wherein said second processing includes using the first flag value included in each of the plurality of read operations in connection with caching, in a cache of the data storage array, the first data that is read by the plurality of read operations from the log of recorded writes performed by the application.

2. The method of claim 1, wherein the driver is a multi-path I/O driver of the host.

3. The method of claim 1, wherein the driver determines that the plurality of read operations are directed to the logical device used as the database log device to log writes performed by the database application based on a process name associated with the process that issued the plurality of read operations.

4. The method of claim 3, wherein the process name includes a first portion and a second portion, and wherein the first portion denotes a particular process of the database application and the second portion is a customized portion denoting a particular instance of the database application.

5. The method of claim 4, wherein the first portion of the process name includes a predetermined string used to identify the process that reads records from the database log device for the database application.

6. The method of claim 1, wherein the first flag value is one of a plurality of predefined flag values, and wherein the first flag value indicates that the first data, stored at the logical addresses of the logical device, is expected to be read once by the database application.

7. The method of claim 6, wherein the method includes:
storing the first data at a one or more first cache locations in the cache of the data storage array;
returning the first data to the host; and
responsive to returning the first data to the host, evicting the first data from the one or more first cache locations.

8. The method of claim 7, wherein said evicting includes marking each of the one or more first cache locations as free and available for use.

9. The method of claim 1, further comprising:
issuing one or more additional I/O operations by a client performing a data service on the data storage array.

10. The method of claim 9, wherein the client is an internal client of the data storage array and wherein the internal client includes code that performs processing for a data storage system service or function and wherein the code of the internal client is internally located within the data storage array.

11. The method of claim 10, wherein the internal client performs backend verification processing of data and associated metadata stored on non-volatile physical storage devices of the data storage array, and wherein the one or more additional I/O operations includes a second read operation that reads second data from a target location, wherein the second read operation includes an I/O flag having a flag value indicating that the second data, stored at the target location, is expected to be read once by the internal client.

12. The method of claim 10, wherein the internal client performs compressibility check processing that determines whether data stored on non-volatile physical storage devices of the data storage array is compressible, and wherein the one or more additional I/O operations includes a second read operation that reads second data from a target location, wherein the second read operation includes an I/O flag having a flag value indicating that the second data, stored at the target location, is expected to be read once by the internal client.

13. The method of claim 10, wherein the internal client performs relocation of data portions among non-volatile physical storage devices of the data storage array, and wherein the one or more additional I/O operations includes a second read operation and a write operation, wherein the second read operation reads second data from a source location of a source device and wherein the write operation writes the second data to a target location of a target device, wherein each of the second read operation and the write operation includes an I/O flag having a flag value indicating that the second data is expected to be read and written infrequently by the internal client.

14. The method of claim 10, wherein the internal client performs processing to rebuild a failed drive of a RAID (Redundant Array of Independent Disks) group, and wherein the one or more additional I/O operations includes one or more read operations that read data from at one or more healthy drives of the RAID group, and wherein the one or more additional I/O operations includes one or more write operations that write data to a replacement drive that replaces the failed drive, wherein each of the one or more read operations and each of the one or more write operations includes an I/O flag having a flag value indicating that the data associated with said each operation is expected to be read and written infrequently by the internal client.

15. The method of claim 10, wherein the internal client performs recovery processing in connection with recovering from a power failure experienced by the data storage array, wherein the one or more additional I/O operations includes a second read operation that reads recovery information, and wherein the second read operation includes an I/O flag having a flag value indicating that the data associated with the second read operation is expected to be infrequently read.

16. The method of claim 1, wherein the database application issues said plurality of read operations that read log data from the logical device used as the database log device in connection with performing data verification and consistency checking of the log data.

17. A system comprising:
one or more processors; and
one or more memories comprising code stored thereon that, when executed, performs a method of processing I/O operations comprising:
issuing, by a process of an application on a host, a plurality of I/O operations;
determining, by a driver on the host, that the plurality of I/O operations are a plurality of read operations that read first data from logical addresses of a logical device that is a block-based logical device exposed, by a data storage array to the host, over a network through at least one path between the host and the data storage array, wherein the logical device is used as a log to record writes performed by the application, and wherein the logical device is configured and provisioned from physical non-volatile storage of one or more backend physical storage devices of the data storage array;
determining, by the driver on the host, that a read data payload of each of the plurality of read operations is larger than a specified threshold size, that the application is a database application reading data from the logical device used as a database log device, and that the plurality of read operations denote a sequential read pattern of read operations that read data from the logical device in a logical sequential order based on consecutive logical addresses of the logical device; and
responsive to determining that a read data payload of each of the plurality of read operations is larger than the specified threshold size, that the application is the database application reading data from the logical device used as the database log device, and that the plurality of read operations denote the sequential read pattern, performing first processing comprising:
  storing, by the driver, an I/O flag in each of the plurality of read operations, wherein the I/O flag of said each read operation has a first flag value denoting an expected read frequency associated with a portion of the first data read by said each read operation;
  sending the plurality of read operations, each including the I/O flag, over the network on the at least one path from the host to the data storage array; and
  performing second processing of the plurality of read operations on the data storage array, wherein said second processing includes using the first flag value included in each of the plurality of read operations in connection with caching, in a cache of the data storage array, the first data that is read by the plurality of read operations from the log of recorded writes performed by the application.

18. A non-transitory computer readable medium comprising code stored thereon that, when executed, performs a method of processing I/O operations comprising:
  issuing, by a process of an application on a host, a plurality of I/O operations;
  determining, by a driver on the host, that the plurality of I/O operations are a plurality of read operations that read first data from logical addresses of a logical device that is a block-based logical device exposed, by a data storage array to the host, over a network through at least one path between the host and the data storage array, wherein the logical device is used as a log to record writes performed by the application, and wherein the logical device is configured and provisioned from physical non-volatile storage of one or more backend physical storage devices of the data storage array;
  determining, by the driver on the host, that a read data payload of each of the plurality of read operations is larger than a specified threshold size, that the application is a database application reading data from the logical device used as a database log device, and that the plurality of read operations denote a sequential read pattern of read operations that read data from the logical device in a logical sequential order based on consecutive logical addresses of the logical device; and
  responsive to determining that a read data payload of each of the plurality of read operations is larger than the specified threshold size, that the application is the database application reading data from the logical device used as the database log device, and that the plurality of read operations denote the sequential read pattern, performing first processing comprising:
    storing, by the driver, an I/O flag in each of the plurality of read operations, wherein the I/O flag of said each read operation has a first flag value denoting an expected read frequency associated with a portion of the first data read by said each read operation;
    sending the plurality of read operations, each including the I/O flag, over the network on the at least one path from the host to the data storage array; and
    performing second processing of the plurality of read operations on the data storage array, wherein said second processing includes using the first flag value included in each of the plurality of read operations in connection with caching, in a cache of the data storage array, the first data that is read by the plurality of read operations from the log of recorded writes performed by the application.

\* \* \* \* \*